United States Patent
Burroughs et al.

(10) Patent No.: US 11,336,424 B1 \
(45) Date of Patent: May 17, 2022

(54) CLOCK DRIFT ESTIMATION

(71) Applicant: Amazon Technologies, Inc., Seattle, WA (US)

(72) Inventors: Stephan Wen-Guang Burroughs, Saratoga, CA (US); Michael A Pogue, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/117,741

(22) Filed: Dec. 10, 2020

(51) Int. Cl.
| | |
|---|---|
| *H04B 3/00* | (2006.01) |
| *H04L 7/00* | (2006.01) |
| *H04R 3/12* | (2006.01) |
| *G06N 20/00* | (2019.01) |
| *G01J 1/42* | (2006.01) |
| *H04R 29/00* | (2006.01) |

(52) U.S. Cl.
CPC .......... *H04L 7/0054* (2013.01); *G01J 1/4204* (2013.01); *G06N 20/00* (2019.01); *H04R 3/12* (2013.01); *H04R 29/001* (2013.01); *H04R 2420/07* (2013.01)

(58) Field of Classification Search
CPC ..... H04L 7/0054; G06N 20/00; G01J 1/4204; H04R 3/12; H04R 29/001; H04R 2420/07
USPC ...................................................... 381/77, 80
See application file for complete search history.

(56) References Cited

U.S. PATENT DOCUMENTS

2019/0088098 A1* 3/2019 Gangumalla ........... G01L 19/12

* cited by examiner

*Primary Examiner* — Ammar T Hamid \
(74) *Attorney, Agent, or Firm* — Lee & Hayes, P.C.

(57) ABSTRACT

Systems and methods for clock drift estimation are disclosed. For example, sensor data may be received that indicates occurrence of one or more environmental conditions that have been predetermined to impact clock crystal frequencies of a device clock. Predictive filters and/or machine learning models may be utilized to determine the impact of the environmental condition on clock drift, and clock drift values may be generated based at least in part on the sensor data. Corrections to content processing, such as the changing of resampling rates, may be applied to compensate for the clock drift value change, which may allow for the time-synchronous output of content as between two or more devices, including while the environmental condition is present.

20 Claims, 9 Drawing Sheets

CLOCK DRIFT ESTIMATION

BACKGROUND

Use of electronic devices to perform actions such as the output of audio has become available. Multiple electronic devices may be utilized to output instances of the same audio in a time-synchronous manner. Described herein are improvements in technology and solutions to technical problems that can be used to, among other things, improve time-synchronous output of content on multiple devices.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
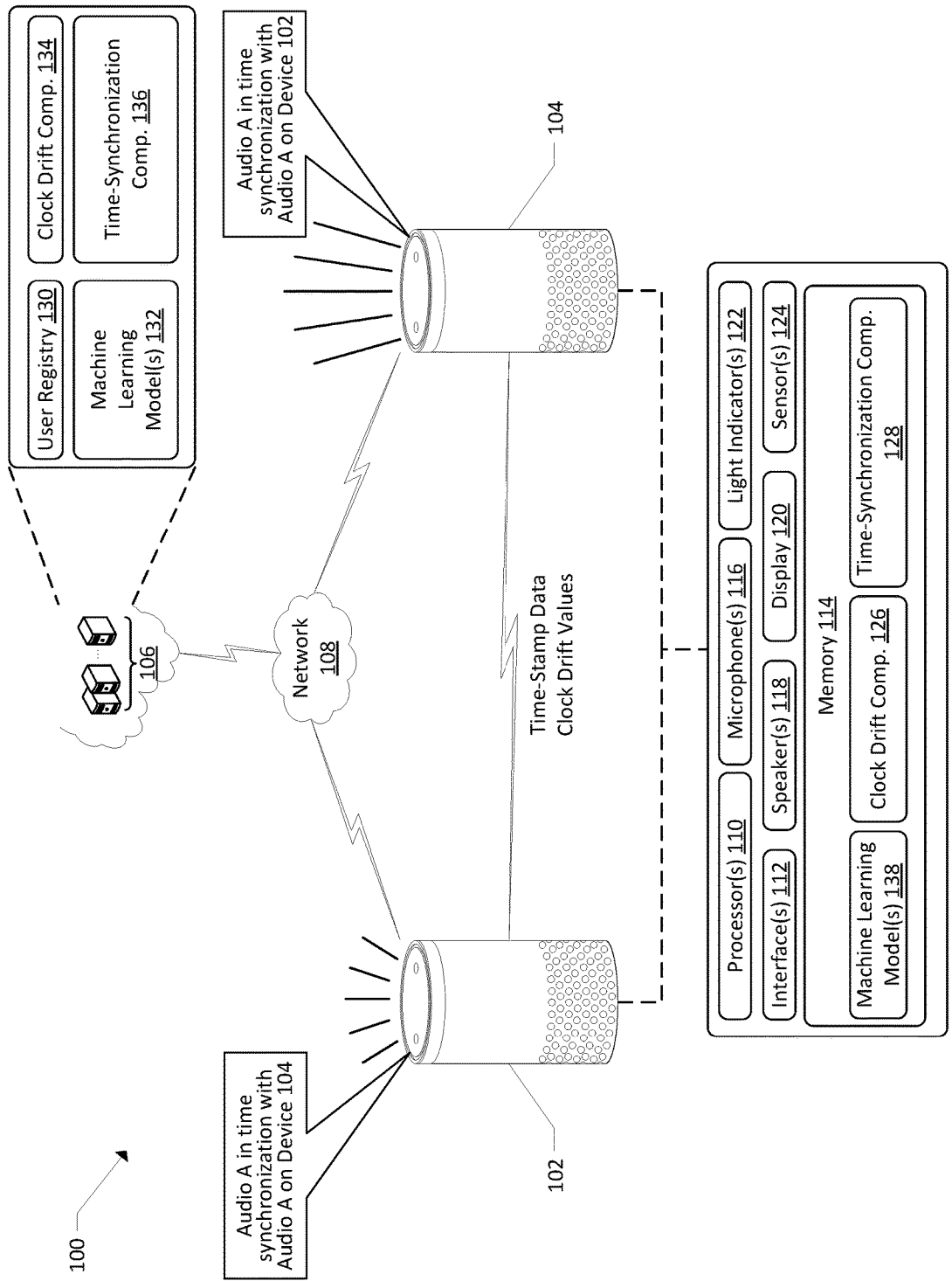
FIG. 1 illustrates a schematic diagram of an example environment for clock drift estimation.

Systems and methods for clock drift estimation are disclosed among other things. Take, for example, an environment (such as a home, vehicle, office, store, restaurant, or other space) where one or more users may be present. The environments may include one or more electronic devices that may be utilized by the users. For example, the electronic devices may include voice interface devices (e.g., Echo devices, mobile phones, tablets, personal computers, etc.), graphical interface devices (e.g., televisions, set top boxes, virtual/augmented reality headsets, etc.), and/or touch interface devices (tablets, phones, Echo Show devices, steering wheels, laptops, kiosks, billboard, other devices with buttons, etc.). These electronic devices may be situated in a home, in a place a business, healthcare facility (e.g., hospital, doctor's office, pharmacy, etc.), in a vehicle (e.g., airplane, truck, car, bus, etc.) in a public forum (e.g., shopping center, store, etc.), for example.

In examples, the electronic devices may be configured to output content, such as audio. In certain examples, multiple electronic devices in the environment may be configured to output instances of the same audio in a time-synchronous manner and/or to output portions of audio data at the same time such that a whole-home audio and/or stereo audio experience is provided. In still other examples, one or more of the electronic devices may be configured to output visual content, while one or more other electronic devices output audio associated with images and/or other type of visual content (e.g., lights on a tree changing color in synchronization with music). In these and other examples, output of content in a time-synchronous manner may depend on each of the devices tracking the passing of time at the same rate or in other words the clocks of each of the devices being synchronized with each other. Without clock synchronization among devices, one clock may run at a different rate than another clock. This difference in timekeeping as between two associated devices is known as clock drift. More specifically, clock drift occurs when clock crystals operate at different frequencies. For example, a given clock crystal may tick 10,000 times per second while another clock crystal may tick at 10,001 times per second. These clock crystal frequency differences, if left unmitigated, will cause possibly large variations in timekeeping between clocks over time. While this clock drift may be problematic or irrelevant in various applications, clock drift can impact the user experience during output of synchronized audio. For example, a variance of 150 microseconds or more between two clocks outputting audio may cause a user to experience an echo effect and/or for at least a portion of the audio to be perceived as being output by only one of the audio-output devices. As such, correction of clock drift is desirable to prevent these and other issues from occurring.

In some embodiments, to correct clock drift, time-stamp data may be exchanged between two or more devices. Specifically, the time-stamp data may indicate how each of the clocks is keeping and tracking time, and the devices may be configured to receive the time-stamp data and compare the time keeping indicated by that time-stamp data to the device's own time keeping. Differences may be identified and variance between the clocks may be compensated for, as described more fully herein. However, the exchange of time-stamp data between devices need not occur continuously thereby saving computational load associated with the exchange and the determination of clock drift using the time-stamp data. Instead, time-stamp data exchange can occur on a scheduled and/or other type of periodic basis, say for example every hour. However, variances in clock crystal frequency can change, sometimes rapidly, based on a number of factors including temperature changes experienced by the clock crystals themselves. As such, scheduled time-stamp data exchange to determine clock drift may not be useful when sudden or unexpected differences in clock crystal frequency occur.

Among other things, provided herein are techniques to identify environmental conditions that impact clock crystal frequency and to determine clock drift between clocks which may or may not be in different devices based at least in part on the detected environmental condition. To do so, sensor data may be received from one or more sensors associated with an environment in which the electronic devices are situated. The sensors may be any sensor that can detect an environmental condition. Some example sensors may include an ambient temperature sensor, an ambient light sensor, a power-consumption sensor, a network-traffic sensor, and/or sensors configured to determine an operational state of one or more components of the devices. For example, the operational state may be determined for components such as a light indicator, a battery, a screen, a central processing unit, a speaker, etc. The sensors may also be configured to determine a location of a given device with respect to the environment and/or with respect to other devices in the environment. In addition to specific environmental conditions that are detectable by the sensors, usage data and/or account data may be utilized to determine if an environmental condition is present and/or is likely to be present. For example, the account data may indicate environmental data, seasonal data, etc. that may impact environmental conditions associated with the devices.

Some or all of this sensor data may be received at a clock drift component of one or more of the devices and/or at a remote system associated with the devices. The clock drift component may be configured to determine clock drift values indicating drift between devices utilizing, for example, the time-stamp data described herein as well as the sensor data. It should be understood that when clock drift is described herein, it includes differences in rates at which two or more clocks run, which is impacted by the clock crystal frequencies of the device clocks. For example, the clock drift component may utilize one or more predictive filters, such as a Kalman filter, and/or one or more models, such as machine learning models, to determine how a given environmental condition may impact clock crystal frequency and thus clock drift. For example, when models are utilized, the models may be configured to determine what inputs impact clock drift. By way of example, historical data indicating environmental conditions and clock drift values may be utilized by the models to determine that a given environmental condition impacts clock drift while another environmental condition does not impact clock drift. Additionally, or alternatively, the models may be configured to determine a degree of impact a given environmental condition has on clock drift and how that degree of impact differs from other environmental conditions. In this way, the models may be utilized to correlate specific environmental conditions to a degree of clock drift caused by those environmental conditions.

The clock drift component may utilize the information determined by the one or more models described herein to determine a clock drift value for clock drift between two devices at a given time while an environmental condition is present. For example, the clock drift component may receive sensor data indicating a change in a brightness level of a light indicator of a device. The clock drift component may utilize the information determined by the one or more models described herein to determine that clock drift will likely be impacted from such sensor data, and the clock drift component may determine whether the change in brightness level satisfies a threshold brightness level change predetermined to indicate an impact on clock crystal frequency. In instances where the environmental condition satisfies a threshold change and/or a threshold value, the sensor data may be formatted for input into the predictive filter(s) and/or model(s) configured to estimate clock drift. The input data may also include time-stamp data associated with the devices, for example. The predictive filter(s) and/or model(s) may utilize the input data to estimate the clock drift value, such as over a period of time when the environmental condition is present.

It should be understood that while light indicator brightness levels are described above as an example environmental condition, the environmental condition may be any environmental condition, particularly conditions that may impact the temperature of the clock crystals. Just by way of example, the sensors may indicate changes in ambient temperature in the environment, changes in ambient light levels in the environment, changes in network usage by the device, power usage by speakers of the device, central processing unit usage by the device, battery usage by the device, batter charging status of the device, a time of day associated with the device, location data associated with the device, and/or environmental data associated with the device. In total, some or all of these signals, and other signals not specifically mentioned herein, may cause a change in temperature of the clock crystals of the device, which may impact clock crystal frequency and alter clock drift. The clock drift component may be configured to input some or all of these signals into predictive filters and/or models to determine how such signals impact clock drift between devices.

By way of further illustration, data other than specific sensor data may also be utilized by the clock drift component to determine if an environmental condition that affects clock drift is present and/or a degree of impact on clock drift. For example, particularly where the devices at issue are associated with a remote system that includes contextual data associated with use of the devices, the remote system may store historical usage data indicating how the devices have been historically used. This data may include indications about relationships between devices, proximity of devices to sources of heat or cold, proximity of devices to windows and/or other parts of an environment that may be impacted by temperature, geographic location of devices and weather associated with that geographic location, device capabilities of the devices such as when the devices are powered by batteries, historical network usage, number of accessory devices in communication with a given device, and/or any other information that may impact the temperature of the environment in which the device is situated and/or how the device operates in a manner that may impact temperature of the device itself.

In addition to determining clock drift values as described herein, the clock drift component may also be configured to determine when to change time-stamp data exchange times. For example, one or more default time-stamp data exchange times may be utilized by the devices. In these examples, the devices may exchange time-stamp data periodically and/or on a scheduled basis, say for example every hour. However, when one or more of the environmental conditions described herein are detected, the clock drift component may be configured to alter the periodicity and/or schedule for time-stamp data exchange. For example, the clock drift component may determine that time-stamp data is to be exchanged between devices associated with the environmental condition more frequently than once every hour, say once every minute, five minutes, ten minutes, etc. The clock drift component may also be configured to determine, from received sensor data, when the environmental condition at issue abates and/or decreases below a threshold level such that the environmental condition does not and/or is likely to not impact clock drift. When this occurs, the clock drift component may cause the time-stamp data exchange rate to return to the default rate, in examples.

The clock drift values determined herein using sensor fusion may be utilized in a number of ways to correct clock drift among devices. In examples, the clock drift values may be utilized by a time-synchronization component to synchronize output of content by the devices. For example, when the content is audio, audio data packets for given content may be sent to a first device and a second device along with instructions for outputting the audio in a time-synchronous manner. When clock drift is present as between the devices, one device may cause audio from the audio data packets to be output more quickly than audio output by the other device. Over time, such as over the course of a song and/or a movie, the differing rates of audio output as between the devices cause the time difference in output of the same audio to increase, potentially above a threshold level where such differences would be perceptible to the human ear and thus impact user experience. The time-synchronization component may correct for this by utilizing the clock drift values determined by the clock drift component to alter the resampling rates associated with the devices. For example, the resampling rate of a given device may indicate a rate at which audio is output on speakers of a device. The resampling rate may be adjusted such that audio is output more quickly and/or more slowly. In examples where the clock drift value indicates that clock crystals of a first device are operating at a higher frequency than clock crystals of a second device, the time-synchronization component may be configured to slow the resampling rate of the first device and/or increase the resampling rate of the second device based at least in part on the clock drift value. By doing so, even though the clock crystals of the two devices are operating at different frequencies, the determined resampling rates cause the output of audio as between the devices to be performed in a time-synchronous manner.

It should be understood that while the example provided herein is with respect to two audio-output devices that output audio in a time-synchronous manner, this disclosure includes the time-synchronous output of any content as between two or more devices. For example, synchronized output of images on one device and related audio on another device may be performed utilizing the techniques described herein.

Additionally, the techniques described herein may be utilized to determine clock drift values and/or the effects of environmental conditions on clock drift values on devices other than a specific device that detected the environmental condition. For example, when account data indicates that two devices are associated with the same environment, the clock drift value determined for one of the devices may also be applied to the other devices in the environment, and/or the sensor data associated with a given device may be applied to the other devices for purposes of determining clock drift. In examples, determining when to apply determined clock drift values to other devices may be based at least in part on relationships between devices, device types, and/or feedback data indicating how well a given predictive filter and/or machine learning model corrected for clock drift for given devices.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 illustrates a schematic diagram of an example system 100 for clock drift estimation. The system 100 may include, for example, a first device 102 and a second device 104, which may be described generally as electronic devices 102, 104 and may include a communal device and/or a personal device. In certain examples, the devices 102, 104 may be a voice-enabled device (e.g., Echo devices, mobile phones, tablets, personal computers, etc.), a video interface device (e.g., televisions, set top boxes, virtual/augmented reality headsets, etc.), a touch interface device (tablets, phones, laptops, kiosks, billboard, etc.), and/or an accessory device (e.g., lights, plugs, locks, thermostats, appliances, televisions, clocks, smoke detectors, doorbells, cameras, motion/magnetic/other security-system sensors, etc.). In examples, the electronic device 102, 104 may be set-top box or other device that receives content data and facilitates the output of content, such as on other devices. The electronic device 102, 104 may be situated in a home, a place a business, healthcare facility (e.g., hospital, doctor's office, pharmacy, etc.), in vehicle (e.g., airplane, truck, car, bus, etc.), and/or in a public forum (e.g., shopping center, store, etc.), for example. The electronic devices 102, 104 may be configured to send data to and/or receive data from a remote system 106, such as via a network 108. It should be understood that where operations are described herein as being performed by the remote system 106, some or all of those operations may be performed by the electronic device 102, 104. It should also be understood that anytime the remote system 106 is referenced, that system may include any system and/or device, whether local to an environment of the electronic device 102, 104 or remote from that environment. Additionally, it should be understood that a given space and/or environment may include numerous electronic devices 102, 104. It should also be understood that when a "space" or "environment" is used herein, those terms mean an area and not necessarily a given room, building, or other structure, unless otherwise specifically described as such.

The electronic devices 102, 104 may include one or more components, such as, for example, one or more processors 110, one or more network interfaces 112, memory 114, one or more microphones 116, one or more speakers 118, one or more displays 120, one or more light indicators 122, and/or one or more sensors 124. The microphones 116 may be configured to capture audio, such as user utterances, and generate corresponding audio data. The speakers 118 may be configured to output audio, such as audio corresponding to audio data received from another device and/or the system 106. The displays 120 may be configured to display images corresponding to image data, such as image data received from the remote system 106 and/or one or more other devices. The light indicators 122 may be configured to emit light, which may provide an indication of a state of the devices 102, 104 and/or to otherwise provide one or more indications about an operation of the devices 102, 104. The sensors 124 may include an component configured to detect an environmental condition associated with the devices 102, 104 and/or the environment associated with the devices 102, 104. Some example sensors 124 may include an ambient temperature sensor, an ambient light sensor, a power-consumption sensor, a network-traffic sensor, and/or sensors configured to determine an operational state of one or more components of the devices. For example, the operational state may be determined for components such as a light indicator, a battery, a screen, a central processing unit, a speaker, etc. The sensors 124 may also be configured to determine a location of a given device with respect to the environment and/or with respect to other devices in the environment. In addition to specific environmental conditions that are detectable by the sensors 124, usage data and/or account data may be utilized to determine if an environmental condition is present and/or is likely to be present. For example, the account data may indicate environmental data, seasonal data, etc. that may impact environmental conditions associated with the devices.

It should be understood that while several examples used herein include a voice-enabled device that allows users to interact therewith via user utterances, one or more other devices, which may not include a voice interface, may be utilized instead of or in addition to voice-enabled devices. In these examples, the device may be configured to send and receive data over the network 108 and to communicate with other devices in the system 100. As such, in each instance where a voice-enabled device is utilized, a computing device that does not include a voice interface may also or alternatively be used. It should be understood that when voice-enabled devices are described herein, those voice-enabled devices may include phones, computers, and/or other computing devices.

The memory 114 of the devices 102, 104 may include one or more components, such as a clock drift component 126, a time-synchronization component 128, and/or one or more machine learning models 138. The operations performed by these components will be described in more detail by way of example below.

The remote system 106 may include components such as, for example, a user registry 130, one or more machine learning models 132, a clock drift component 134, and/or a time-synchronization component 136. The remote system 106 may also include components that are not specifically illustrated in FIG. 1. For example, the remote system 106 may include a speech-processing system. It should be understood that while the components of the remote system 106 are depicted and/or described as separate from each other in FIG. 1, some or all of the components may be a part of the same system. The speech-processing system may include an automatic speech recognition component (ASR) and/or a natural language understanding component (NLU). Each of the components described herein with respect to the remote system 106 may be associated with their own systems, which collectively may be referred to herein as the remote system 106, and/or some or all of the components may be associated with a single system. Additionally, the remote system 106 may include one or more applications, which may be described as skills. "Skills," as described herein may be applications and/or may be a subset of an application. For example, a skill may receive data representing an intent. For example, an intent may be determined by the NLU component and/or as determined from user input via a computing device. Skills may be configured to utilize the intent to output data for input to a text-to-speech component, a link or other resource locator for audio data, and/or a command to a device, such as the electronic device 102, 104. "Skills" may include applications running on devices, such as the electronic device 102, 104, and/or may include portions that interface with voice user interfaces of electronic devices 102, 104.

In instances where a voice-enabled device is utilized, skills may extend the functionality of devices 102, 104 that can be controlled by users utilizing a voice-user interface. In some examples, skills may be a type of application that may be useable in association with accessory devices and may have been developed specifically to work in connection with given accessory devices. Additionally, skills may be a type of application that may be useable in association with the voice-enabled device and may have been developed specifically to provide given functionality to the voice-enabled device. In examples, a non-skill application may be an application that does not include the functionality of a skill. Speechlets, as described herein, may be a type of application that may be usable in association with voice-enabled devices and may have been developed specifically to work in connection with voice interfaces of voice-enabled devices. The application(s) may be configured to cause processor(s) to receive information associated with interactions with the voice-enabled device. The application(s) may also be utilized, in examples, to receive input, such as from a user of a personal device and/or the voice-enabled device and send data and/or instructions associated with the input to one or more other devices.

The components of the remote system 106 are described in detail below. In examples, some or each of the components of the remote system 106 may include their own processor(s), network interface(s), and/or memory. As such, by way of example, the speech-processing system may include and/or be associated with processor(s), network interface(s), and/or memory. The other components of the remote system 106, such as the clock drift component 126, may include and/or be associated with different processor(s), network interface(s), and/or memory, or one or more of these components may utilize some or all of the same processor(s), network interface(s), and/or memory utilized by the speech-processing system. These components are described in detail below. Additionally, the operations and/or functionalities associated with and/or described with respect to the components of the remote system 106 may be performed utilizing cloud-based computing resources. For example, web-based systems such as Elastic Compute Cloud systems or similar systems may be utilized to generate and/or present a virtual computing environment for performance of some or all of the functionality described herein. Additionally, or alternatively, one or more systems that may be configured to perform operations without provisioning and/or managing servers, such as a Lambda system or similar system, may be utilized.

With respect to the components of the memory 114 of the devices 102, 104 and/or the remote system 106, the user registry 130 may be configured to determine and/or generate associations between users, user accounts, and/or devices. For example, one or more associations between user accounts may be identified, determined, and/or generated by the user registry 130. The user registry 130 may additionally store information indicating one or more applications and/or resources accessible to and/or enabled for a given user account. Additionally, the user registry 130 may include information indicating device identifiers, such as naming identifiers, associated with a given user account, as well as device types associated with the device identifiers. The user registry 130 may also include information indicating user account identifiers, naming indicators of devices associated with user accounts, and/or associations between devices, such as the devices 102, 104. The user registry 130 may also include information associated with usage of the devices 102, 104. It should also be understood that a user account may be associated with one or more than one user profiles. It should also be understood that the term "user account"

may be used to describe a set of data and/or functionalities associated with a given account identifier. For example, data identified, determined, and/or generated while using some or all of the system 100 may be stored or otherwise associated with an account identifier. Data associated with the user accounts may include, for example, account access information, historical usage data, device-association data, and/or preference data.

The speech-processing system may be configured to receive audio data from the devices 102, 104 and/or other devices and perform speech-processing operations. For example, the ASR component may be configured to generate text data corresponding to the audio data, and the NLU component may be configured to generate intent data corresponding to the audio data. In examples, intent data may be generated that represents the audio data, such as without the generation and/or use of text data. The intent data may indicate a determined intent associated with the user utterance as well as a payload and/or value associated with the intent. For example, for a user utterance of "play Song A on Speaker 1 and Speaker 2," the NLU component may identify a "play content" intent and the payload may be "Song A on Speaker 1 and Speaker 2." In this example where the intent data indicates an intent to output audio associated with Song A on two devices, the speech-processing system may call one or more speechlets to effectuate the intent. Speechlets, as described herein may otherwise be described as applications and may include functionality for utilizing intent data to generate directives and/or instructions. For example, a music speechlet may be called when the intent indicates that a song is to be provided. The speechlet may be designated as being configured to handle the intent of identifying and providing audio data representing songs, for example. The speechlet may receive the intent data and/or other data associated with the user utterance from the NLU component, such as by an orchestrator of the remote system 106, and may perform operations to instruct the devices 102, 104 to output the content, for example. The remote system 106 may generate audio data confirming that requested content has been provided, such as by a text-to-speech component. The audio data may be sent from the remote system 106 to the electronic devices 102, 104 for output of corresponding audio by the speakers 118 of the devices 102, 104.

In examples, the electronic devices 102, 104 may be configured to output content, such as audio. In certain examples, multiple electronic devices 102, 104 in the environment may be configured to output instances of the same audio in a time-synchronous manner and/or to output portions of audio data at the same time such that a whole-home audio and/or stereo audio experience is provided. In still other examples, one or more of the electronic devices 102, 104 may be configured to output visual content, while one or more other electronic devices 102, 104 output audio associated with images and/or other type of visual content (e.g., lights on a tree changing color in synchronization with music). In these and other examples, output of content in a time-synchronous manner may depend on each of the devices 102, 104 tracking the passing of time at the same rate or in other words the clocks of each of the devices 102, 104 being synchronized with each other. Without clock synchronization among devices, one clock may indicate that time passes more quickly than another clock. This difference in timekeeping as between two associated devices is known as clock drift, as described above.

To correct clock drift as described herein, techniques to identify environmental conditions that impact clock crystal frequency and to determine clock drift between devices 102, 104 based at least in part on the detected environmental condition are provided. To do so, sensor data may be received from one or more of the sensors 124 associated with an environment in which the electronic devices 102, 104 are situated. The sensors 124 are described more fully above.

Some or all of this sensor data may be received at the clock drift component 126 of one or more of the devices 102, 104 and/or at the clock drift component 134 of the remote system 106. It should be understood that when the clock drift component 126 of the devices 102, 104 is described herein as performing an operation, the operation may also or alternatively be performed by the clock drift component 134 of the remote system 106. The clock drift component 126, 134 may be configured to determine clock drift values indicating drift between devices 102, 104 utilizing, for example, the time-stamp data described herein as well as the sensor data. For example, the clock drift component 126, 134 may utilize one or more predictive filters, such as a Kalman filter, and/or one or more models, such as machine learning models 132, 138, to determine how a given environmental condition may impact clock crystal frequency and thus clock drift. For example, when models 132, 138 are utilized, the models 132, 138 may be configured to determine what inputs impact clock drift. By way of example, historical data indicating environmental conditions and clock drift values may be utilized by the models 132, 138 to determine that a given environmental condition impacts clock drift while another environmental condition does not impact clock drift. Additionally, or alternatively, the models 132, 138 may be configured to determine a degree of impact a given environmental condition has on clock drift and how that degree of impact differs from other environmental conditions. In this way, the models may be utilized to correlate specific environmental conditions to a degree of clock drift caused by those environmental conditions.

The clock drift component 126, 134 may utilize the information determined by the one or more models described herein to determine a clock drift value for clock drift between two devices 102, 104 at a given time while an environmental condition is present. For example, the clock drift component 126, 134 may receive sensor data indicating a change in a brightness level of a light indicator 122 of a device 102, 104. The clock drift component 126, 134 may utilize the information determined by the one or more models 132, 138 described herein to determined that clock drift will likely be impacted from such sensor data, and the clock drift component 126, 134 may determine whether the change in brightness level satisfies a threshold brightness level change predetermined to indicate an impact on clock crystal frequency. In instances where the environmental condition satisfies a threshold change and/or a threshold value, the sensor data may be formatted for input into the predictive filter(s) and/or model(s) 132, 138 configured to estimate clock drift. The input data may also include time-stamp data associated with the devices 102, 104, for example. The predictive filter(s) and/or model(s) 132, 138 may utilize the input data to estimate the clock drift value, such as over a period of time when the environmental condition is present.

It should be understood that while light indicator brightness levels are described above as an example environmental condition, the environmental condition may be any environmental condition, particularly conditions that may impact the temperature of the clock crystals. Just by way of example, the sensors 124 may indicate changes in ambient temperature in the environment, changes in ambient light levels in the environment, changes in network usage by the device 102, 104, power usage by speakers 118 of the device 102, 104, central processing unit usage by the device 102, 104, battery usage by the device 102, 104, battery charging status of the device 102, 104, a time of day associated with the device 102, 104, location data associated with the device 102, 104, and/or environmental data associated with the device 102, 104. In total, some or all of these signals, and other signals not specifically mentioned herein, may cause a change in temperature of the clock crystals of the device 102, 104, which may impact clock crystal frequency and alter clock drift. The clock drift component 126, 134 may be configured to input some or all of these signals into predictive filters and/or models 132, 138 to determine how such signals impact clock drift between devices 102, 104.

By way of further illustration, data other than specific sensor data may also be utilized by the clock drift component 126, 134 to determine if an environmental condition that affects clock drift is present and/or a degree of impact on clock drift. For example, particularly where the devices 102, 104 at issue are associated with the remote system 106 that includes contextual data associated with use of the devices 102, 104, the remote system 106 may store historical usage data indicating how the devices 102, 104 have been historically used. This data may include indications about relationships between devices 102, 104, proximity of devices 102, 104 to sources of heat or cold, proximity of devices 102, 104 to windows and/or other parts of an environment that may be impacted by temperature, geographic location of devices 102, 104 and weather associated with that geographic location, device capabilities of the devices 102, 104 such as when the devices 102, 104 are powered by batteries, historical network usage, number of accessory devices in communication with a given device 102, 104, and/or any other information that may impact the temperature of the environment in which the device 102, 104 is situated and/or how the device 102, 104 operates in a manner that may impact temperature of the device 102, 104 itself.

In addition to determining clock drift values as described herein, the clock drift component 126, 134 may also be configured to determine when to change time-stamp data exchange times. For example, one or more default time-stamp data exchange times may be utilized by the devices 102, 104. In these examples, the devices 102, 104 may exchange time-stamp data periodically and/or on a scheduled basis, say for example every hour. However, when one or more of the environmental conditions described herein are detected, the clock drift component 126, 134 may be configured to alter the periodicity and/or schedule for time-stamp data exchange. For example, the clock drift component 126, 134 may determine that time-stamp data is to be exchanged between devices 102, 104 associated with the environmental condition more frequently than once every hour, say once every minute, five minutes, ten minutes, etc. The clock drift component 126, 134 may also be configured to determine, from received sensor data, when the environmental condition at issue abates and/or decreases below a threshold level such that the environmental condition does not and/or is likely to not impact clock drift. When this occurs, the clock drift component 126, 134 may cause the time-stamp data exchange rate to return to the default rate, in examples.

The clock drift values determined herein using sensor fusion may be utilized in a number of ways to correct clock drift among devices. In examples, the clock drift values may be utilized by the time-synchronization component 128 of the devices 102, 104 and/or the time-synchronization component 136 of the remote system 106 to synchronize output of content by the devices 102, 104. For example, when the content is audio, audio data packets for given content may be sent to the first device 102 and the second device 104 along with instructions for outputting the audio in a time-synchronous manner. When clock drift is present as between the devices 102, 104, one device 102 may cause audio from the audio data packets to be output more quickly than audio output by the other device 104. Over time, such as over the course of a song and/or a movie, the differing rates of audio output as between the devices 102, 104 cause a time difference in output of the same audio to increase, potentially above a threshold level where such differences would be perceptible to the human ear and thus impact user experience. The time-synchronization component 128, 136 may correct for this by utilizing the clock drift values determined by the clock drift component 126, 134 to alter the resampling rates associated with the devices 102, 104. For example, the resampling rate of a given device 102 may indicate a rate at which audio is output on speakers 118 of the device 102. The resampling rate may be adjusted such that audio is output more quickly and/or more slowly. In examples where the clock drift value indicates that clock crystals of the first device 102 are operating at a higher frequency than clock crystals of the second device 104, the time-synchronization component 128, 136 may be configured to slow the resampling rate of the first device 102 and/or increase the resampling rate of the second device 104 based at least in part on the clock drift value. By doing so, even though the clock crystals of the two devices 102, 104 are operating at different frequencies, the determined resampling rates cause the output of audio as between the devices 102, 104 to be performed in a time-synchronous manner.

It should be understood that while the example provided herein is with respect to two audio-output devices 102, 104 that output audio in a time-synchronous manner, this disclosure includes the time-synchronous output of any content as between two or more devices 102, 104. For example, synchronized output of images on one device 102 and related audio on another device 104 may be performed utilizing the techniques described herein.

Additionally, the techniques described herein may be utilized to determine clock drift values and/or the effects of environmental conditions on clock drift values on devices other than a specific device that detected the environmental condition. For example, when account data indicates that two devices are associated with the same environment, the clock drift value determined for one of the devices 102 may also be applied to the other devices 104 in the environment, and/or the sensor data associated with a given device 102 may be applied to the other devices 104 for purposes of determining clock drift. In examples, determining when to apply determined clock drift values to other devices may be based at least in part on relationships between devices, device types, and/or feedback data indicating how well a given predictive filter and/or machine learning model 132, 138 corrected for clock drift for given devices.

The machine learning models 132, 138 as described herein may include predictive analytic techniques, which may include, for example, predictive modelling, machine learning, and/or data mining. Generally, predictive modelling may utilize statistics to predict outcomes. Machine learning, while also utilizing statistical techniques, may provide the ability to improve outcome prediction performance without being explicitly programmed to do so. A number of machine learning techniques may be employed to generate and/or modify the models describes herein. Those techniques may include, for example, decision tree learning, association rule learning, artificial neural networks (including, in examples, deep learning), inductive logic programming, support vector machines, clustering, Bayesian networks, reinforcement learning, representation learning, similarity and metric learning, sparse dictionary learning, and/or rules-based machine learning.

Information from stored and/or accessible data may be extracted from one or more databases and may be utilized to predict trends and behavior patterns. In examples, the event, otherwise described herein as an outcome, may be an event that will occur in the future, such as whether presence will be detected. The predictive analytic techniques may be utilized to determine associations and/or relationships between explanatory variables and predicted variables from past occurrences and utilizing these variables to predict the unknown outcome. The predictive analytic techniques may include defining the outcome and data sets used to predict the outcome. Then, data may be collected and/or accessed to be used for analysis.

Data analysis may include using one or more models, including for example one or more algorithms, to inspect the data with the goal of identifying useful information and arriving at one or more determinations that assist in predicting the outcome of interest. One or more validation operations may be performed, such as using statistical analysis techniques, to validate accuracy of the models. Thereafter, predictive modelling may be performed to generate accurate predictive models for future events. Outcome prediction may be deterministic such that the outcome is determined to occur or not occur. Additionally, or alternatively, the outcome prediction may be probabilistic such that the outcome is determined to occur to a certain probability and/or confidence.

It should be noted that while text data is described as a type of data utilized to communicate between various components of the remote system 106 and/or other systems and/or devices, the components of the remote system 106 may use any suitable format of data to communicate. For example, the data may be in a human-readable format, such as text data formatted as XML, SSML, and/or other markup language, or in a computer-readable format, such as binary, hexadecimal, etc., which may be converted to text data for display by one or more devices such as the devices 102, 104.

As shown in FIG. 1, several of the components of the remote system 106 and the associated functionality of those components as described herein may be performed by one or more of the electronic devices 102, 104. Additionally, or alternatively, some or all of the components and/or functionalities associated with the electronic devices 102, 104 may be performed by the remote system 106.

It should be noted that the exchange of data and/or information as described herein may be performed only in situations where a user has provided consent for the exchange of such information. For example, upon setup of devices and/or initiation of applications, a user may be provided with the opportunity to opt in and/or opt out of data exchanges between devices and/or for performance of the functionalities described herein. Additionally, when one of the devices is associated with a first user account and another of the devices is associated with a second user account, user consent may be obtained before performing some, any, or all of the operations and/or processes described herein. Additionally, the operations performed by the components of the systems described herein may be performed only in situations where a user has provided consent for performance of the operations.

As used herein, a processor, such as processor(s) 110 and/or the processor(s) described with respect to the components of the remote system 106, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 110 and/or the processor(s) described with respect to the components of the remote system 106 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 110 and/or the processor(s) described with respect to the components of the remote system 106 may possess its own local memory, which also may store program components, program data, and/or one or more operating systems.

The memory 114 and/or the memory described with respect to the components of the remote system 106 may include volatile and nonvolatile memory, removable and non-removable media implemented in any method or technology for storage of information, such as computer-readable instructions, data structures, program component, or other data. Such memory 114 and/or the memory described with respect to the components of the remote system 106 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 114 and/or the memory described with respect to the components of the remote system 106 may be implemented as computer-readable storage media ("CRSM"), which may be any available physical media accessible by the processor(s) 110 and/or the processor(s) described with respect to the remote system 106 to execute instructions stored on the memory 114 and/or the memory described with respect to the components of the remote system 106. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as memory 114 and/or the memory described with respect to the components of the remote system 106, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Wash., USA; the Windows operating system from Microsoft Corporation of Redmond, Wash., USA; LynxOS as promulgated by Lynx Software Technologies, Inc. of San Jose, Calif.; Operating System Embedded (Enea OSE) as promulgated by ENEA AB of Sweden; and so forth.

The network interface(s) 112 and/or the network interface(s) described with respect to the components of the remote system 106 may enable messages between the components and/or devices shown in system 100 and/or with one or more other polling systems, as well as other networked devices. Such network interface(s) 112 and/or the network interface(s) described with respect to the components of the remote system 106 may include one or more network interface controllers (NICs) or other types of transceiver devices to send and receive messages over the network 108.

For instance, each of the network interface(s) 112 and/or the network interface(s) described with respect to the components of the remote system 106 may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) 112 and/or the network interface(s) described with respect to the components of the remote system 106 may include a wide area network (WAN) component to enable message over a wide area network.

In some instances, the remote system 106 may be local to an environment associated the electronic devices 102, 104. For instance, the remote system 106 may be located within one or more of the electronic devices 102, 104. In some instances, some or all of the functionality of the remote system 106 may be performed by one or more of the electronic devices 102, 104. Also, while various components of the remote system 106 have been labeled and named in this disclosure and each component has been described as being configured to cause the processor(s) to perform certain operations, it should be understood that the described operations may be performed by some or all of the components and/or other components not specifically illustrated. It should be understood that, in addition to the above, some or all of the operations described herein may be performed on a phone or other mobile device and/or on a device local to the environment, such as, for example, a hub device in a home and/or office environment, a self-driving automobile, a bus, an airplane, a camper, a trailer, and/or other similar object having a computer to perform its own sensor processing, etc.

Figure 2:
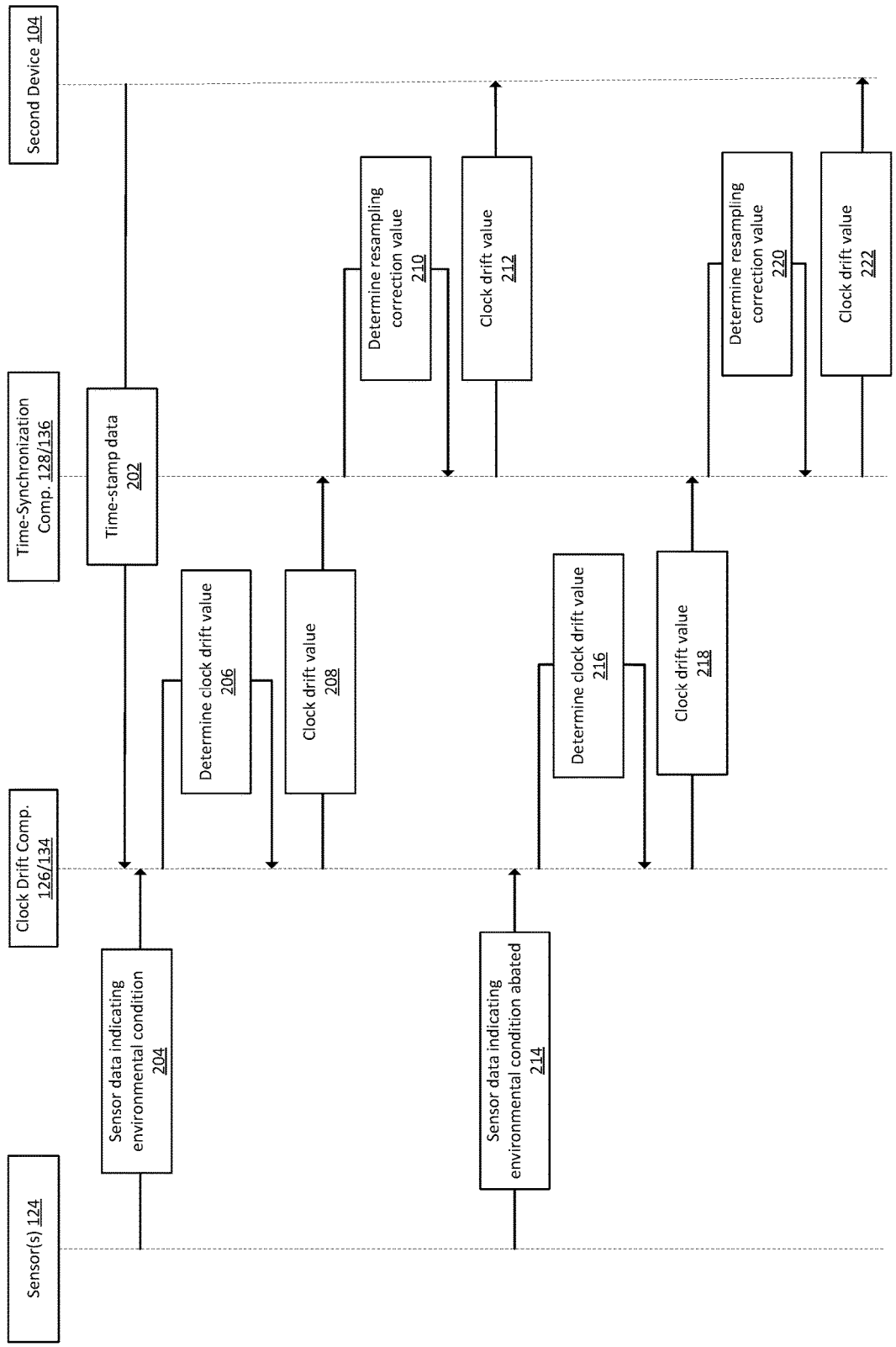
FIG. 2 illustrates a sequence diagram showing an example process associated with clock drift estimation.

FIG. 2 illustrates a sequence diagram showing an example process associated with clock drift estimation. While the sequence diagram depicts the performance of operations and/or the transmission of certain data in a sequential manner, the operations may be performed in a different order than the order depicted in FIG. 2 and/or at least a portion of the operations may be performed in parallel.

At block 202, a second device 104 may send time-stamp data to a clock drift component 126, 134. For example, to correct clock drift, time-stamp data may be exchanged between two or more devices. Specifically, the time-stamp data may indicate how each of the clocks is keeping and tracking time, and the devices may be configured to receive the time-stamp data and compare the time keeping indicated by that time-stamp data to the device's own time keeping. Differences may be identified and variance between the clocks may be compensated for, as described more fully herein.

At block 204, one or more sensors 124 may send sensor data indicating an environmental condition to the clock drift component 126, 134. For example, sensor data may be received from one or more sensors associated with an environment in which electronic devices are situated. The sensors may be any sensor that can detect an environmental condition. Some example sensors may include an ambient temperature sensor, an ambient light sensor, a power-consumption sensor, a network-traffic sensor, and/or sensors configured to determine an operational state of one or more components of the devices. For example, the operational state may be determined for components such as a light indicator, a battery, a screen, a central processing unit, a speaker, etc. The sensors may also be configured to determine a location of a given device with respect to the environment and/or with respect to other devices in the environment. In addition to specific environmental conditions that are detectable by the sensors, usage data and/or account data may be utilized to determine if an environmental condition is present and/or is likely to be present. For example, the account data may indicate environmental data, seasonal data, etc. that may impact environmental conditions associated with the devices.

At block 206, the clock drift component 126, 134 may determine a clock drift value. For example, the clock drift component 126, 134 may be configured to determine clock drift values indicating drift between devices utilizing, for example, the time-stamp data described herein as well as the sensor data. For example, the clock drift component 126, 134 may utilize one or more predictive filters, such as a Kalman filter, and/or one or more models, such as machine learning models, to determine how a given environmental condition may impact clock crystal frequency and thus clock drift. For example, when models are utilized, the models may be configured to determine what inputs impact clock drift. By way of example, historical data indicating environmental conditions and clock drift values may be utilized by the models to determine that a given environmental condition impacts clock drift while another environmental condition does not impact clock drift. Additionally, or alternatively, the models may be configured to determine a degree of impact a given environmental condition has on clock drift and how that degree of impact differs from other environmental conditions. In this way, the models may be utilized to correlate specific environmental conditions to a degree of clock drift caused by those environmental conditions.

The clock drift component 126, 134 may utilize the information determined by the one or more models described herein to determine a clock drift value for clock drift between two devices at a given time while an environmental condition is present. For example, the clock drift component 126, 134 may receive sensor data indicating a change in a brightness level of a light indicator 122 of a device. The clock drift component 126, 134 may utilize the information determined by the one or more models described herein to determine that clock drift will likely be impacted from such sensor data, and the clock drift component 126, 134 may determine whether the change in brightness level satisfies a threshold brightness level change predetermined to indicate an impact on clock crystal frequency. In instances where the environmental condition satisfies a threshold change and/or a threshold value, the sensor data may be formatted for input into the predictive filter(s) and/or model(s) configured to estimate clock drift. The input data may also include time-stamp data associated with the devices, for example. The predictive filter(s) and/or model(s) may utilize the input data to estimate the clock drift value, such as over a period of time when the environmental condition is present.

It should be understood that while light indicator brightness levels are described above as an example environmental condition, the environmental condition may be any environmental condition, particularly conditions that may impact the temperature of the clock crystals. Just by way of example, the sensors may indicate changes in ambient temperature in the environment, changes in ambient light levels in the environment, changes in network usage by the device, power usage by speakers of the device, central processing unit usage by the device, battery usage by the device, battery charging status of the device, a time of day associated with the device, location data associated with the device, and/or environmental data associated with the device. In total, some or all of these signals, and other signals not specifically mentioned herein, may cause a change in temperature of the clock crystals of the device, which may impact clock crystal frequency and alter clock drift. The clock drift component 126, 134 may be configured to input some or all of these signals into predictive filters and/or models to determine how such signals impact clock drift between devices.

By way of further illustration, data other than specific sensor data may also be utilized by the clock drift component 126, 134 to determine if an environmental condition that affects clock drift is present and/or a degree of impact on clock drift. For example, particularly where the devices at issue are associated with the remote system that includes contextual data associated with use of the devices, the remote system may store historical usage data indicating how the devices have been historically used. This data may include indications about relationships between devices, proximity of devices to sources of heat or cold, proximity of devices to windows and/or other parts of an environment that may be impacted by temperature, geographic location of devices and weather associated with that geographic location, device capabilities of the devices such as when the devices are powered by batteries, historical network usage, number of accessory devices in communication with a given device, and/or any other information that may impact the temperature of the environment in which the device is situated and/or how the device operates in a manner that may impact temperature of the device itself.

At block 208, the clock drift component 126, 134 may send the clock drift value to a time-synchronization component 128, 136. For example, the clock drift value may indicate a degree of difference between timekeeping by a clock of one device and a clock of another device. The time-synchronization component 128, 136 may be configured to utilize this data to correct for the timekeeping difference as described herein.

At block 210, the time-synchronization component 128, 136 may determining a resampling correction value to apply for content output utilizing the clock drift value. For example, when the content is audio, audio data packets for given content may be sent to a first device and the second device 104 along with instructions for outputting the audio in a time-synchronous manner. When clock drift is present as between the devices, one device may cause audio from the audio data packets to be output more quickly than audio output by the other device 104. Over time, such as over the course of a song and/or a movie, the differing rates of audio output as between the devices cause a time difference in output of the same audio to increase, potentially above a threshold level where such differences would be perceptible to the human ear and thus impact user experience. The time-synchronization component 128, 136 may correct for this by utilizing the clock drift values determined by the clock drift component 126, 134 to alter the resampling rates associated with the devices. For example, the resampling rate of a given device may indicate a rate at which audio is output on speakers of the device. The resampling rate may be adjusted such that audio is output more quickly and/or more slowly. In examples where the clock drift value indicates that clock crystals of the first device are operating at a higher frequency than clock crystals of the second device 104, the time-synchronization component 128, 136 may be configured to slow the resampling rate of the first device and/or increase the resampling rate of the second device 104 based at least in part on the clock drift value. By doing so, even though the clock crystals of the two devices are operating at different frequencies, the determined resampling rates cause the output of audio as between the devices to be performed in a time-synchronous manner.

At block 212, the time-synchronization component 128, 136 may send the clock drift value and/or the resampling correction value to the second device 104. For example, the devices may communicate clock drift values and/or resampling values and/or other packet processing information such that each device may be able to determine how clock drift correction is being performed as between the devices. In examples, one of the devices may perform the operations associated with determining clock drift values and resampling rates, and data representing this information may be sent to other devices that are to utilizing that information for performing resampling changes on those devices.

At block 214, the one or more sensors 124 may send additional sensor data indicating that the environmental condition has abated to the clock drift component 126, 134. The sending of additional sensor data may be performed in the same or a similar manner as the sending of sensor data as described with respect to block 204.

At block 216, the clock drift component 126, 134 may determine a clock drift value absent the environmental condition. Determining the clock drift value may be performed in the same or a similar manner as the determination of clock drift values as described with respect to block 206.

At block 218, the clock drift component 126, 134 may send the clock drift value to the time-synchronization component 128, 136. Sending the clock drift value may be performed in the same or a similar manner as the sending of clock drift values as described with respect to block 208.

At block 220, the time-synchronization component 128, 136 may determine a resampling correction value to apply when the environmental condition is absent. Determining the resampling correction value may be performed in the same or a similar manner as determining the resampling correction value as described with respect to block 210.

At block 222, the time-synchronization component 128, 136 may send the clock drift value and/or resampling correction value to the second device 104. Sending the resampling correction value may be performed in the same or a similar manner as described with respect to block 212.

Figure 3:
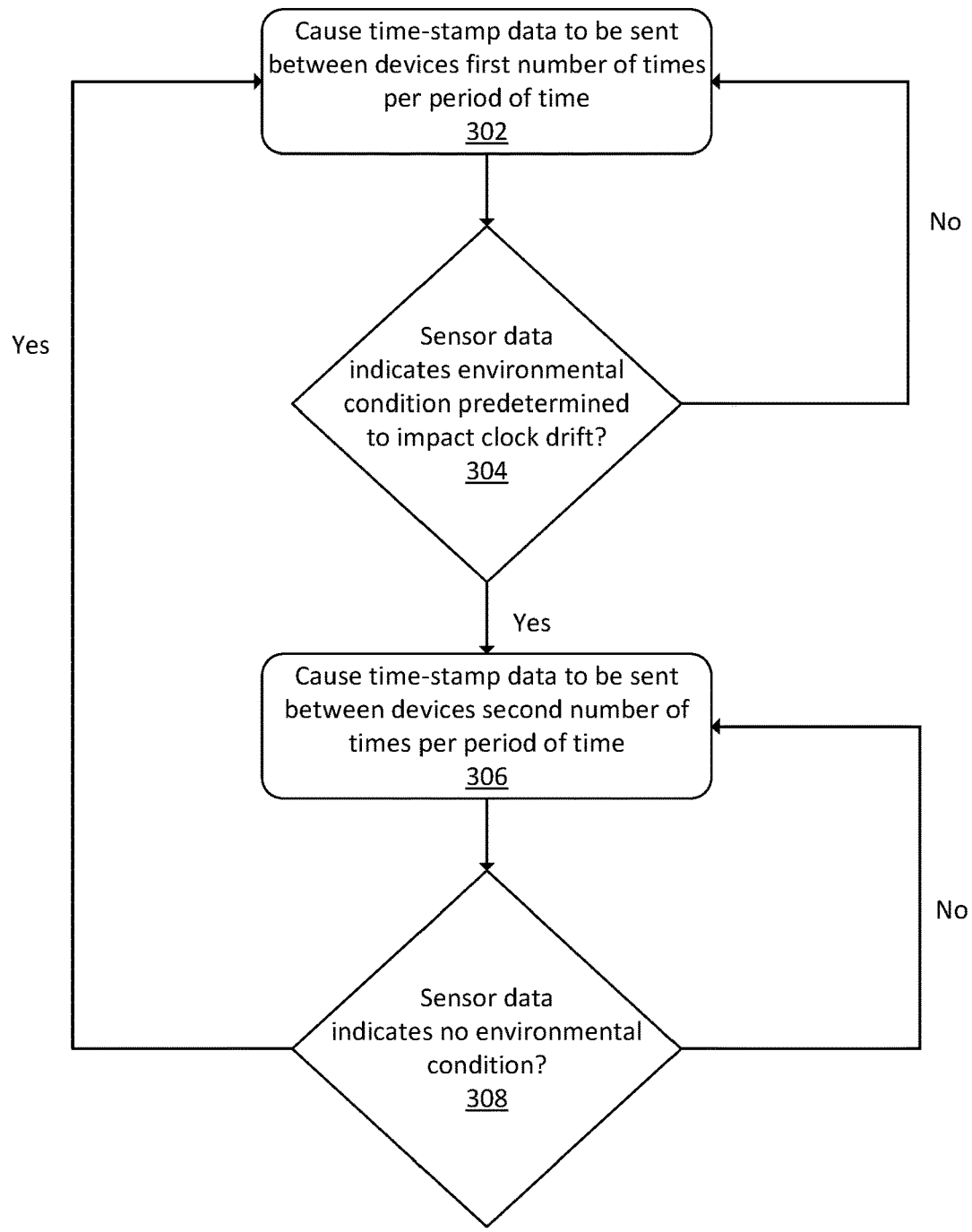
FIG. 3 illustrates a flow diagram of an example process for dynamic time-stamp data exchange rate determination.

FIG. 3 illustrates processes for dynamic time-stamp data exchange rate determination. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1, 2, and 4-9, although the processes may be implemented in a wide variety of other environments, architectures and systems.

FIG. 3 illustrates a flow diagram of an example process 300 for dynamic time-stamp data exchange rate determination. The order in which the operations or steps are described is not intended to be construed as a limitation, and any number of the described operations may be combined in any order and/or in parallel to implement process 300.

At block 302, the process 300 may include causing time-stamp data to be sent between devices a first number of time per period of time. For example, to correct clock drift, time-stamp data may be exchanged between two or more devices. Specifically, the time-stamp data may indicate how each of the clocks is keeping and tracking time, and the devices may be configured to receive the time-stamp data and compare the time keeping indicated by that time-stamp data to the device's own time keeping. Differences may be identified and variance between the clocks may be compensated for, as described more fully herein. In these examples, a default periodicity and/or schedule for exchanging time-stamp data may be utilized. This default periodicity and/or schedule may be sufficient for identifying clock drift generally.

At block 304, the process 300 may include determining whether sensor data indicates an environmental condition predetermined to impact clock drift. For example, sensor data may be received from one or more sensors associated with an environment in which electronic devices are situated. The sensors may be any sensor that can detect an environmental condition. Some example sensors may include an ambient temperature sensor, an ambient light sensor, a power-consumption sensor, a network-traffic sensor, and/or sensors configured to determine an operational state of one or more components of the devices. For example, the operational state may be determined for components such as a light indicator, a battery, a screen, a central processing unit, a speaker, etc. The sensors may also be configured to determine a location of a given device with respect to the environment and/or with respect to other devices in the environment. In addition to specific environmental conditions that are detectable by the sensors, usage data and/or account data may be utilized to determine if an environmental condition is present and/or is likely to be present. For example, the account data may indicate environmental data, seasonal data, etc. that may impact environmental conditions associated with the devices.

If no sensor data is received and/or if received sensor data does not indicate the environmental condition, then the process 300 may return to block 302. In this way, the process may include receiving sensor data and utilizing that sensor data to determine when an environmental condition predetermined to affect clock drift occurs. When no such environmental condition is detected, the system may go about determining clock drift utilizing the default time-stamp data exchange periodicity and/or schedule.

If the sensor data indicates the environmental condition, then at block 306 the process 300 may include causing time-stamp data to be sent between device a second number of time per the period of time. For example, the system may utilize the sensor data to determine clock drift between devices and to take corrective measures such as determining resampling data to be utilized by the devices to correct for the clock drift. Additionally, given that the system has now received data indicating that an environmental condition is affecting clock drift, the rate at which time-stamp data is exchanged between devices may be changed. In this way, the clock drift value determinations may be performed more frequently while the environmental condition is present, which may allow for more frequently correction of clock drift between devices during this period of time.

At block 308, the process 300 may include determining whether additional sensor data indicates that the environmental condition has abated. For example, once the environmental condition is detected, the system may query or otherwise receive additional sensor data from the one or more sensors. The additional sensor data may be utilized to determine whether the environmental condition that was detected is still present in the environment and/or a degree of the environmental condition. For example, the brightness level of a light indicator of a device may change over time, and that brightness level change may have an impact on the degree of clock drift, with, for example, a greater brightness having a greater impact on clock drift than a lesser brightness.

If the additional sensor data indicates that the environmental condition is still present, the process 300 may return to block 306. In this example, the system may determine whether the environmental condition that was detected is still present at a given time or whether the condition has abated. While the environmental condition is still present, the second number of times may be utilized for the time-stamp data exchange rate between devices.

If the additional sensor data indicates that the environmental condition has abated, the process 300 may return to block 302. In this example, the default periodicity and/or schedule may be reverted to for time-stamp data exchange between devices, at least until the environmental condition and/or another environmental condition occurs.

In addition to changing the periodicity and/or schedule at which time-stamp data is exchanged between devices, the processes described with respect to FIG. 3 may also be utilized to determine changes in time-stamp data retention and/or utilization periods. For example, when the environmental condition is not detected, a default time-stamp data retention and/or utilization period may be utilized. However, when the environmental condition is detected, the time-stamp data retention and/or utilization period may increase or decrease. By way of example, when the environmental condition is present, the time-stamp data retention and/or utilization rate may decrease such that only recent time-stamp data is utilized for determination clock drift values.

Figure 4:
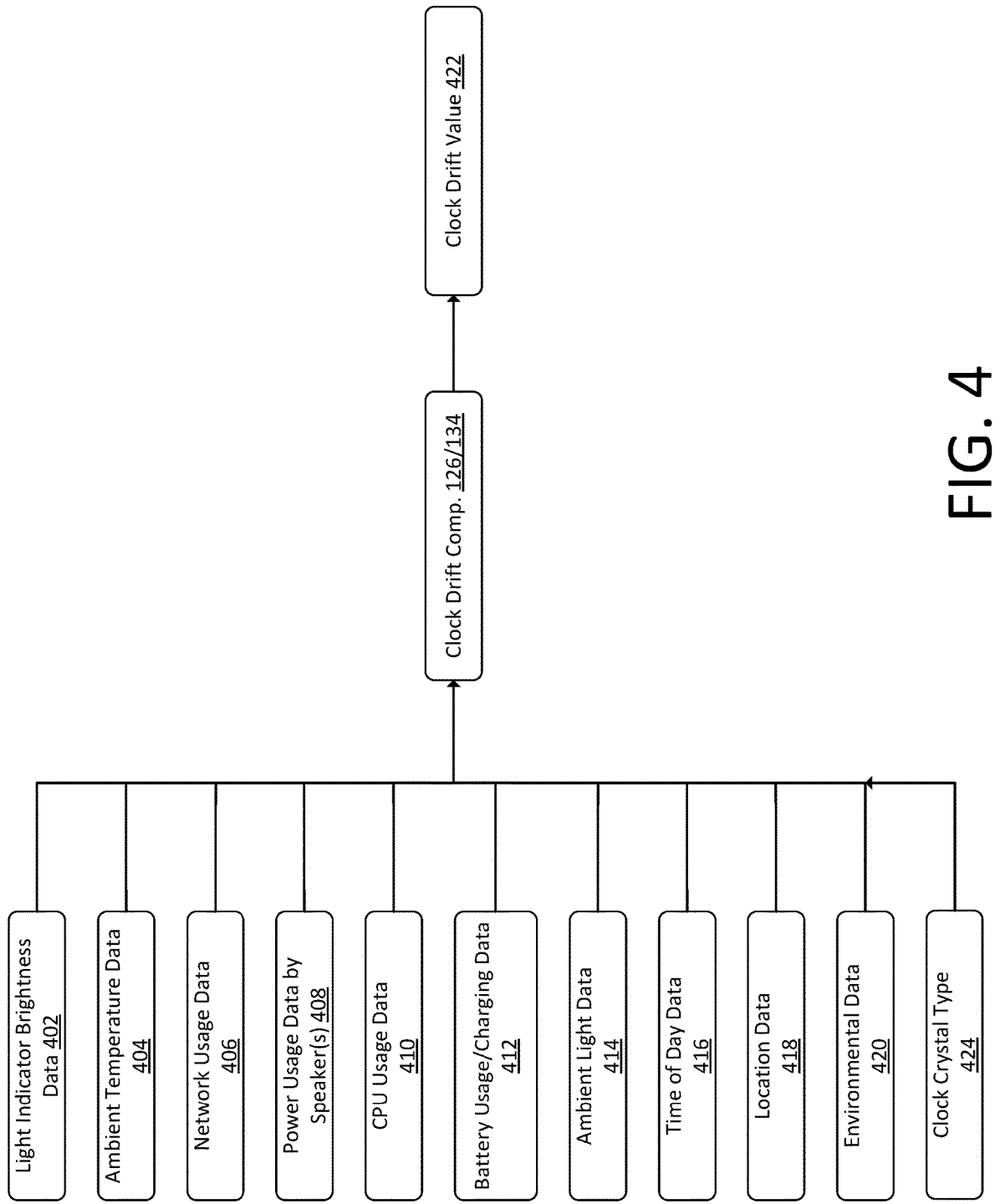
FIG. 4 illustrates a conceptual diagram of data and components utilized for clock drift estimation.

FIG. 4 illustrates a conceptual diagram of data and components utilized for clock drift estimation. The components may include at least some of the same or similar components as shown in FIG. 1. For example, the components may include a clock drift component 126, 134.

As described herein, one or more sensors may be utilized to generate and send sensor data to the clock drift component 126, 134. Some nonlimiting examples of sensor data are provided in FIG. 4 by way of example. The illustrated data types include light indicator brightness data 402, ambient temperature data 404, network usage data 406, power usage data 408 by speakers of the device, CPU usage data 410, battery usage and/or charging data 412, ambient light data 414, time of day data 416, location data 418, environmental data 420, and/or clock crystal type 422.

For example, the light indicator brightness data 402 may indicate whether a light indicator is on or off on a device, a color of the light indicator, and/or an intensity of light emitted from the light indicator. Some or all of this information may impact the temperature of clock crystals of the device, which may impact clock drift as described herein. The ambient temperature data 404 may indicate a change in ambient temperature in an environment associated with the device. Certain ambient temperature changes may impact the clock crystals and thus impact clock drift. The network usage data 406 may indicate a quantity of network usage, such as wireless network usage by the device. As network usage increases, particularly when that network usage increases suddenly, processing by the device associated with the sending and/or receiving of data over a network may increase the temperature of the clock crystals and thus impact clock drift. The power usage data 408 by speakers of the device may indicate whether speakers of the device are being caused to output audio and an amount of power being utilized to output the audio. The amount of power may increase when the volume is increased, or in other words more power may be needed to output song at a louder volume than at a softer volume. This increase in power usage by the speakers may increase the temperature associated with the device, which may impact the clock crystals and thus clock drift. The CPU usage data 410 may indicate a degree of CPU usage by the device, such as for performing one or more processes associated with the device. Increased CPU usage may result in increased temperature to the clock crystals of the device, which may impact clock drift. The battery usage and/or charging data 412 may indicate whether the device is running on battery power and/or whether the battery of the device is currently being recharged. In these situations, the usage of a battery to power the device and/or the recharging of the battery may increase the temperature associated with the device, which may impact the clock crystals and thus the clock drift between devices. The ambient light data 414 may indicate a degree of ambient light in an environment associated with the device. For example, certain environmental conditions such as weather may cause the amount of light associated with an environment to change. These light changes may also be associated with temperature changes, which may impact the clock crystals and thus impact clock drift values. The time of day data 416 may indicate when events associated with a change in temperature have historically occurred and/or are likely to occur, and this information may be utilized to determine changes in temperature to the clock crystals. The location data 418 may indicate a location of the device, such as with respect to other objects in the environmental. This information may be utilized to determine whether given times of day impact the temperature of the device and/or whether the device is near other devices that emit heat or cold in such a way as to impact the clock crystals of the device. The environmental data 420 may include information about the weather and/or events associated with the environmental that may impact the temperature of the device. The clock crystal type 424 may indicate the type of clock crystal associated with the one or more devices, and the type of clock crystal may be utilized to reference known information on clock crystal frequencies associated with the clock crystal type and/or how the environmental condition impacts the clock crystal frequencies.

Some, all, or other types of sensor data and/or historical usage data as described herein may be formatted for input to the clock drift component 126, 134. For example, the clock drift component 126, 134 may be configured to determine clock drift values 422 indicating drift between devices utilizing, for example, the time-stamp data described herein as well as the sensor data. For example, the clock drift component 126, 134 may utilize one or more predictive filters, such as a Kalman filter, and/or one or more models, such as machine learning models to determine how a given environmental condition may impact clock crystal frequency and thus clock drift. For example, when models are utilized, the models may be configured to determine what inputs impact clock drift. By way of example, historical data indicating environmental conditions and clock drift values 422 may be utilized by the models to determine that a given environmental condition impacts clock drift while another environmental condition does not impact clock drift. Additionally, or alternatively, the models may be configured to determine a degree of impact a given environmental condition has on clock drift and how that degree of impact differs from other environmental conditions. In this way, the models may be utilized to correlate specific environmental conditions to a degree of clock drift caused by those environmental conditions.

The clock drift component 126, 134 may utilize the information determined by the one or more models described herein to determine a clock drift value 422 for clock drift between two devices at a given time while an environmental condition is present. For example, the clock drift component 126, 134 may receive sensor data indicating a change in a brightness level of a light indicator of a device. The clock drift component 126, 134 may utilize the information determined by the one or more models described herein to determined that clock drift will likely be impacted from such sensor data, and the clock drift component 126, 134 may determine whether the change in brightness level satisfies a threshold brightness level change predetermined to indicate an impact on clock crystal frequency. In instances where the environmental condition satisfies a threshold change and/or a threshold value, the sensor data may be formatted for input into the predictive filter(s) and/or model(s) configured to estimate clock drift. The input data may also include time-stamp data associated with the devices, for example. The predictive filter(s) and/or model(s) may utilize the input data to estimate the clock drift value 422, such as over a period of time when the environmental condition is present.

Figure 5:
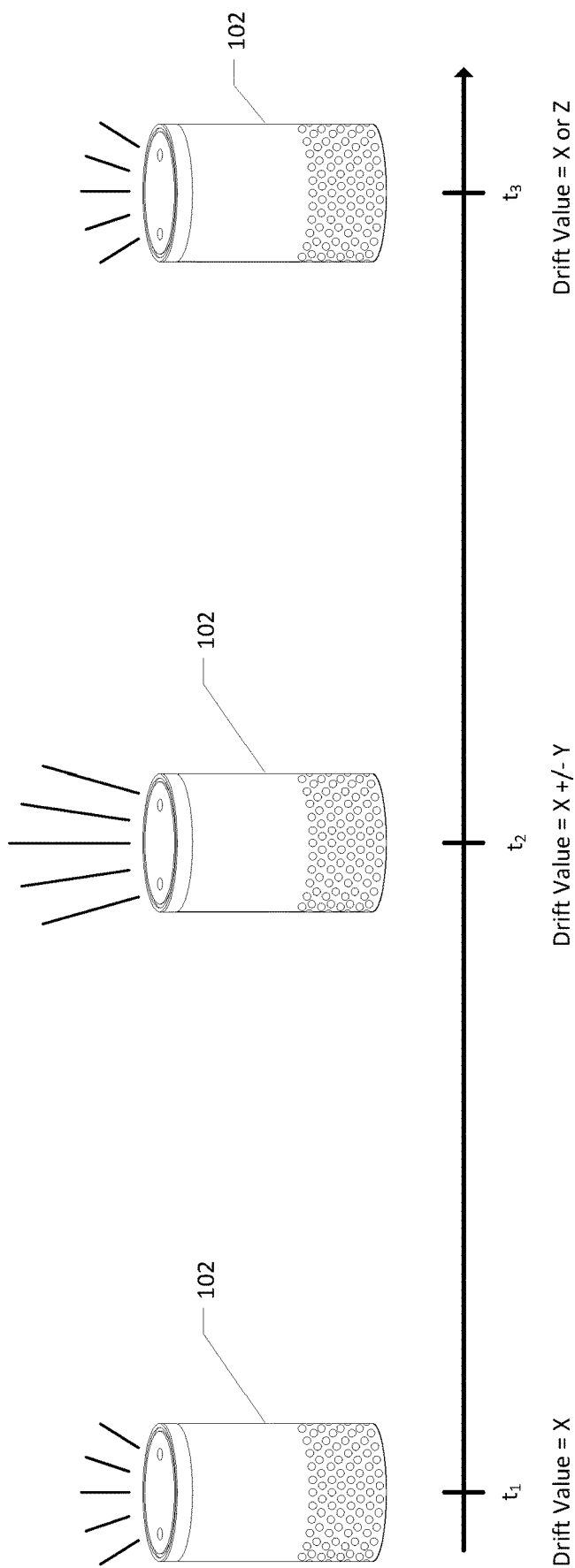
FIG. 5 illustrates a conceptual diagram of components utilized for dynamic clock drift value determinations over time.

FIG. 5 illustrates a conceptual diagram of components utilized for dynamic clock drift value determinations over time. FIG. 5 illustrates an example device 102, which may be in communication with one or more other devices and may be configured to output content in a time-synchronous matter with the one or more other devices, as described more fully elsewhere herein. FIG. 5 illustrates an example condition of the device, here the brightness of a light indicator of the device, as that condition changes over time. FIG. 5 also illustrates the impact on clock drift values associated with the change in the condition.

For example, at time $t_1$, the light indicator brightness value associated with the device 102 may be a certain value. The intensity of the light indicator brightness is illustrated in FIG. 5 by lines extending from the top of the device 102. At some subsequent time, demarcated in FIG. 5 as $t_2$, the light indicator brightness value associated with the device 102 may change. Here, at time $t_2$, the light indicator brightness value increases as illustrated in FIG. 5 by longer lines extending from the top of the device 102.

As shown, the clock drift value at $t_1$ is determined to be X. But when the light brightness value changes at time $t_2$ the clock drift value is determined to be X+/−Y. To illustrate this, when the environmental condition predetermined to impact temperature of clock crystals of the device is present, the impact on the clock crystals may impact the clock drift between two devices. In some examples, an increased temperature may result in the clock drift value increasing, such as to X+Y. However, in other examples, an increased temperature may result in the clock drift value decreasing, such as to X−Y. A determination of whether the temperature change will either increase or decrease clock drift values may be dependent at least in part on initial temperatures of the devices and the initial clock crystal frequencies of the clock crystals prior to the environmental condition occurring.

Then, at some subsequent time, demarcated in FIG. 5 as $t_3$, the environmental condition may abate or decrease below a threshold level such that the environmental condition no longer impacts the clock crystals of the device. In this example, the determined clock drift value may also change, such as to X. In other examples, even when the environmental condition abates, the clock drift value may not necessarily revert back to the value at time $t_1$, but may extend be some other value, such as Z as indicated in FIG. 5. This may result when other conditions on clock crystal frequencies are present and/or based on changes in clock crystal operation, such as over time.

Figure 6:
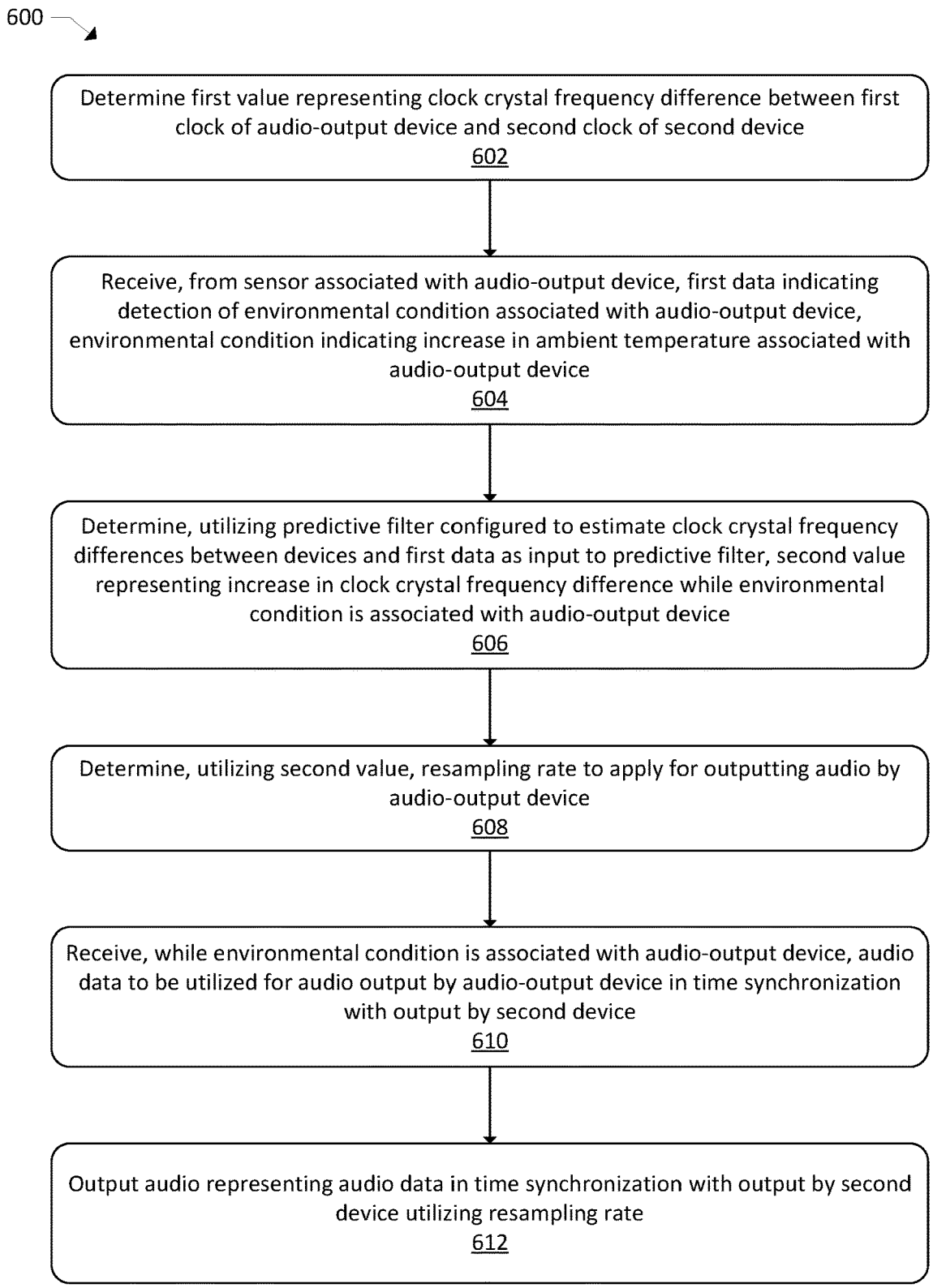
FIG. 6 illustrates a flow diagram of an example process for clock drift estimation.
Figure 7:
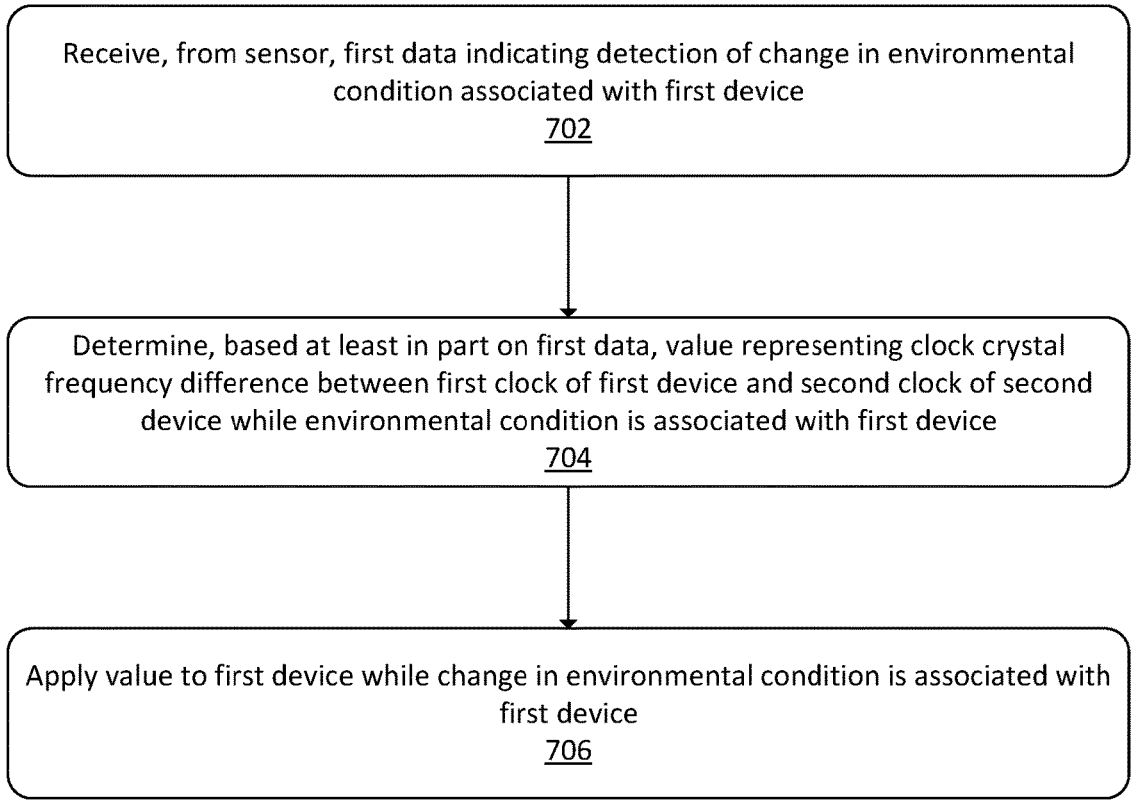
FIG. 7 illustrates a flow diagram of another example process for clock drift estimation.

FIGS. 6 and 7 illustrate processes for clock drift estimation. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-5, 8, and 9, although the processes may be implemented in a wide variety of other environments, architectures and systems.

FIG. 6 illustrates a flow diagram of an example process 600 for clock drift estimation. The order in which the operations or steps are described is not intended to be construed as a limitation, and any number of the described operations may be combined in any order and/or in parallel to implement process 600.

At block 602, the process 600 may include determining a first value representing a clock crystal frequency difference between a first clock of the audio-output device and a second clock of a second device. For example, to correct clock drift, time-stamp data may be exchanged between two or more devices. Specifically, the time-stamp data may indicate how each of the clocks is keeping and tracking time, and the devices may be configured to receive the time-stamp data and compare the time keeping indicated by that time-stamp data to the device's own time keeping. Differences may be identified and variance between the clocks may be compensated for, as described more fully herein. However, the exchange of time-stamp data between devices does not occur continuously given the computational load associated with the exchange and the determination of clock drift using the time-stamp data. Instead, time-stamp data exchange occurs on a scheduled and/or periodic basis, say for example every hour. However, variances in clock crystal frequency can change, sometimes rapidly, based on a number of factors including temperature changes experienced by the clock crystals themselves. As such, scheduled time-stamp data exchange to determine clock drift may not be useful when sudden or unexpected differences in clock crystal frequency occur.

At block 604, the process 600 may include receiving, from a sensor associated with the audio-output device, first data indicating detection of an environmental condition associated with the audio-output device, the environmental condition indicating an increase in ambient temperature associated with the audio-output device. For example, sensor data may be received from one or more sensors associated with an environment in which electronic devices are situated. The sensors may be any sensor that can detect an environmental condition. Some example sensors may include an ambient temperature sensor, an ambient light sensor, a power-consumption sensor, a network-traffic sensor, and/or sensors configured to determine an operational state of one or more components of the devices. For example, the operational state may be determined for components such as a light indicator, a battery, a screen, a central processing unit, a speaker, etc. The sensors may also be configured to determine a location of a given device with respect to the environment and/or with respect to other devices in the environment. In addition to specific environmental conditions that are detectable by the sensors, usage data and/or account data may be utilized to determine if an environmental condition is present and/or is likely to be present. For example, the account data may indicate environmental data, seasonal data, etc. that may impact environmental conditions associated with the devices.

At block 606, the process 600 may include determining, utilizing a predictive filter configured to estimate clock crystal frequency differences between devices and the first data as input to the predictive filter, a second value representing an increase in the clock crystal frequency difference while the environmental condition is associated with the audio-output device. For example, the clock drift component may be configured to determine clock drift values indicating drift between devices utilizing, for example, the time-stamp data described herein as well as the sensor data. For example, the clock drift component may utilize one or more predictive filters, such as a Kalman filter, and/or one or more models, such as machine learning models, to determine how a given environmental condition may impact clock crystal frequency and thus clock drift. For example, when models are utilized, the models may be configured to determine what inputs impact clock drift. By way of example, historical data indicating environmental conditions and clock drift values may be utilized by the models to determine that a given environmental condition impacts clock drift while another environmental condition does not impact clock drift. Additionally, or alternatively, the models may be configured to determine a degree of impact a given environmental condition has on clock drift and how that degree of impact differs from other environmental conditions. In this way, the models may be utilized to correlate specific environmental conditions to a degree of clock drift caused by those environmental conditions.

The clock drift component may utilize the information determined by the one or more models described herein to determine a clock drift value for clock drift between two devices at a given time while an environmental condition is present. For example, the clock drift component may receive sensor data indicating a change in a brightness level of a light indicator of a device. The clock drift component may utilize the information determined by the one or more models described herein to determined that clock drift will likely be impacted from such sensor data, and the clock drift component may determine whether the change in brightness level satisfies a threshold brightness level change predetermined to indicate an impact on clock crystal frequency. In instances where the environmental condition satisfies a threshold change and/or a threshold value, the sensor data may be formatted for input into the predictive filter(s) and/or model(s) configured to estimate clock drift. The input data may also include time-stamp data associated with the devices, for example. The predictive filter(s) and/or model(s) may utilize the input data to estimate the clock drift value, such as over a period of time when the environmental condition is present.

It should be understood that while light indicator brightness levels are described above as an example environmental condition, the environmental condition may be any environmental condition, particularly conditions that may impact the temperature of the clock crystals. Just by way of example, the sensors may indicate changes in ambient temperature in the environment, changes in ambient light levels in the environment, changes in network usage by the device, power usage by speakers of the device, central processing unit usage by the device, battery usage by the device, batter charging status of the device, a time of day associated with the device, location data associated with the device, and/or environmental data associated with the device. In total, some or all of these signals, and other signals not specifically mentioned herein, may cause a change in temperature of the clock crystals of the device, which may impact clock crystal frequency and alter clock drift. The clock drift component may be configured to input some or all of these signals into predictive filters and/or models to determine how such signals impact clock drift between devices.

By way of further illustration, data other than specific sensor data may also be utilized by the clock drift component to determine if an environmental condition that affects clock drift is present and/or a degree of impact on clock drift. For example, particularly where the devices at issue are associated with a remote system that includes contextual data associated with use of the devices, the remote system may store historical usage data indicating how the devices have been historically used. This data may include indications about relationships between devices, proximity of devices to sources of heat or cold, proximity of devices to windows and/or other parts of an environment that may be impacted by temperature, geographic location of devices and weather associated with that geographic location, device capabilities of the devices such as when the devices are powered by batteries, historical network usage, number of accessory devices in communication with a given device, and/or any other information that may impact the temperature of the environment in which the device is situated and/or how the device operates in a manner that may impact temperature of the device itself.

At block 608, the process 600 may include determining, utilizing the second value, a resampling rate to apply for outputting audio by the audio-output device. For example, a time-synchronization component may correct for this by utilizing the clock drift values determined by the clock drift component to alter the resampling rates associated with the devices.

At block 610, the process 600 may include receiving, while the environmental condition is associated with the audio-output device, audio data to be utilized for audio output by the audio-output device in time synchronization with output by the second device. For example, a user may have requested that audio corresponding to the audio data be output in time-synchronization by the devices at issue. This request may be processed and the requested content may be provided to the devices for output.

At block 612, the process 600 may include outputting audio representing the audio data in time synchronization with output by the second device utilizing the resampling rate. For example, the resampling rate of a given device may indicate a rate at which audio is output on speakers of a device. The resampling rate may be adjusted such that audio is output more quickly and/or more slowly. In examples where the clock drift value indicates that clock crystals of a first device are operating at a higher frequency than clock crystals of a second device, the time-synchronization component may be configured to slow the resampling rate of the first device and/or increase the resampling rate of the second device based at least in part on the clock drift value. By doing so, even though the clock crystals of the two devices are operating at different frequencies, the determined resampling rates cause the output of audio as between the devices to be performed in a time-synchronous manner.

Additionally, or alternatively, the process 600 may include storing second data indicating a first amount of time between when the audio-output device and the second device are scheduled to exchange time-stamp data for determining the clock drift. The process 600 may also include determining, in response to receiving the first data, a second amount of time to schedule exchange of the time-stamp data while the environmental condition is associated with the audio-output device, the second amount of time being less than the first amount of time. The process 600 may also include sending the time-stamp data to the second device at intervals corresponding to the second amount of time.

Additionally, or alternatively, the process 600 may include determining that the first data indicates an amount of power being utilized by the audio-output device to cause a speaker of the audio-output device to output the audio. The process 600 may also include determining that the amount of power satisfies a threshold amount of power predetermined to correspond to a temperature increase associated with components of the audio-output device. In these examples, the first data may indicate detection of the environmental condition in response to the amount of power satisfying the threshold amount of power.

Additionally, or alternatively, the process 600 may include determining that the first data indicates a brightness value of the light indicator. The process 600 may also include determining that the brightness value satisfies a threshold brightness value predetermined to correspond to a temperature increase associated with components of the audio-output device. In these examples, the first data may indicate detection of the environmental condition in response to the brightness value satisfying the threshold brightness value.

FIG. 7 illustrates a flow diagram of another example process 700 for clock drift estimation. The order in which the operations or steps are described is not intended to be construed as a limitation, and any number of the described operations may be combined in any order and/or in parallel to implement process 700.

At block 702, the process 700 may include receiving, from a sensor, first data indicating detection of a change in an environmental condition associated with a first device. For example, sensor data may be received from one or more sensors associated with an environment in which electronic devices are situated. The sensors may be any sensor that can detect an environmental condition. Some example sensors may include an ambient temperature sensor, an ambient light sensor, a power-consumption sensor, a network-traffic sensor, and/or sensors configured to determine an operational state of one or more components of the devices. For example, the operational state may be determined for components such as a light indicator, a battery, a screen, a central processing unit, a speaker, etc. The sensors may also be configured to determine a location of a given device with respect to the environment and/or with respect to other devices in the environment. In addition to specific environmental conditions that are detectable by the sensors, usage data and/or account data may be utilized to determine if an environmental condition is present and/or is likely to be present. For example, the account data may indicate environmental data, seasonal data, etc. that may impact environmental conditions associated with the devices.

At block 704, the process 700 may include determining, based at least in part on the first data, a value representing a clock crystal frequency difference between a first clock of the first device and a second clock of a second device while the environmental condition is associated with the first device. For example, the clock drift component may be configured to determine clock drift values indicating drift between devices utilizing, for example, the time-stamp data described herein as well as the sensor data. For example, the clock drift component may utilize one or more predictive filters, such as a Kalman filter, and/or one or more models, such as machine learning models, to determine how a given environmental condition may impact clock crystal frequency and thus clock drift. For example, when models are utilized, the models may be configured to determine what inputs impact clock drift. By way of example, historical data indicating environmental conditions and clock drift values may be utilized by the models to determine that a given environmental condition impacts clock drift while another environmental condition does not impact clock drift. Additionally, or alternatively, the models may be configured to determine a degree of impact a given environmental condition has on clock drift and how that degree of impact differs from other environmental conditions. In this way, the models may be utilized to correlate specific environmental conditions to a degree of clock drift caused by those environmental conditions.

The clock drift component may utilize the information determined by the one or more models described herein to determine a clock drift value for clock drift between two devices at a given time while an environmental condition is present. For example, the clock drift component may receive sensor data indicating a change in a brightness level of a light indicator of a device. The clock drift component may utilize the information determined by the one or more models described herein to determined that clock drift will likely be impacted from such sensor data, and the clock drift component may determine whether the change in brightness level satisfies a threshold brightness level change predetermined to indicate an impact on clock crystal frequency. In instances where the environmental condition satisfies a threshold change and/or a threshold value, the sensor data may be formatted for input into the predictive filter(s) and/or model(s) configured to estimate clock drift. The input data may also include time-stamp data associated with the devices, for example. The predictive filter(s) and/or model(s) may utilize the input data to estimate the clock drift value, such as over a period of time when the environmental condition is present.

It should be understood that while light indicator brightness levels are described above as an example environmental condition, the environmental condition may be any environmental condition, particularly conditions that may impact the temperature of the clock crystals. Just by way of example, the sensors may indicate changes in ambient temperature in the environment, changes in ambient light levels in the environment, changes in network usage by the device, power usage by speakers of the device, central processing unit usage by the device, battery usage by the device, batter charging status of the device, a time of day associated with the device, location data associated with the device, and/or environmental data associated with the device. In total, some or all of these signals, and other signals not specifically mentioned herein, may cause a change in temperature of the clock crystals of the device, which may impact clock crystal frequency and alter clock drift. The clock drift component may be configured to input some or all of these signals into predictive filters and/or models to determine how such signals impact clock drift between devices.

By way of further illustration, data other than specific sensor data may also be utilized by the clock drift component to determine if an environmental condition that affects clock drift is present and/or a degree of impact on clock drift. For example, particularly where the devices at issue are associated with a remote system that includes contextual data associated with use of the devices, the remote system may store historical usage data indicating how the devices have been historically used. This data may include indications about relationships between devices, proximity of devices to sources of heat or cold, proximity of devices to windows and/or other parts of an environment that may be impacted by temperature, geographic location of devices and weather associated with that geographic location, device capabilities of the devices such as when the devices are powered by batteries, historical network usage, number of accessory devices in communication with a given device, and/or any other information that may impact the temperature of the environment in which the device is situated and/or how the device operates in a manner that may impact temperature of the device itself.

At block 706, the process 700 may include applying the value to the first device while the change in the environmental condition is associated with the first device. For example, a time-synchronization component may correct for this by utilizing the clock drift values determined by the clock drift component to alter the resampling rates associated with the devices. For example, the resampling rate of a given device may indicate a rate at which audio is output on speakers of a device. The resampling rate may be adjusted such that audio is output more quickly and/or more slowly. In examples where the clock drift value indicates that clock crystals of a first device are operating at a higher frequency than clock crystals of a second device, the time-synchronization component may be configured to slow the resampling rate of the first device and/or increase the resampling rate of the second device based at least in part on the clock drift value. By doing so, even though the clock crystals of the two devices are operating at different frequencies, the determined resampling rates cause the output of audio as between the devices to be performed in a time-synchronous manner.

Additionally, or alternatively, the process 700 may include storing second data indicating a first amount of time between when the first device and the second device are scheduled to exchange time-stamp data. The process 700 may also include determining, based at least in part on the first data, a second amount of time to schedule exchange of the time-stamp data. The process 700 may also include causing the first device to send the time-stamp data to the second device based at least in part on the second amount of time.

Additionally, or alternatively, the process 700 may include determining that the first data indicates an amount of power being utilized by the first device to cause a speaker of the first device to output audio. The process 700 may also include determining that the amount of power contributes to the change in the environmental condition.

Additionally, or alternatively, the process 700 may include determining that the first data indicates a brightness value of a light indicator associated with the first device. The process 700 may also include determining that the brightness value contributes to the change in the environmental condition based.

Additionally, or alternatively, the process 700 may include determining that the first data indicates a usage value of a wireless network associated with the first device. The process 700 may also include determining that the usage value contributes to the change in the environmental condition.

Additionally, or alternatively, the process 700 may include determining, based at least in part on account data associated with the first device, a location of the first device in an environment, the location indicated as being associated with temperature change at a time of day. The process 700 may also include determining that the first data indicates the time of day. In these examples, the first data may indicate detection of the change in the environmental condition based at least in part on the first data indicating the time of day.

Additionally, or alternatively, the process 700 may include determining, utilizing a machine learning model trained to estimate clock crystal frequency differences between devices, that data from the sensor indicates temperature change of the first device, wherein receiving the first data is in response to querying the first device for the first data based at least in part on determining that the data from the sensor indicates the temperature change. The process 700 may also include determining, utilizing the machine learning model and based at least in part on the first data, a degree of the change in the temperature. In these examples, determining the value representing the clock crystal frequency different may be based at least in part on the degree of the change in the temperature.

Additionally, or alternatively, the process 700 may include identifying a third device having the device type. The process 700 may also include applying the value to the third device while the environmental condition is associated with the first device.

Figure 8:
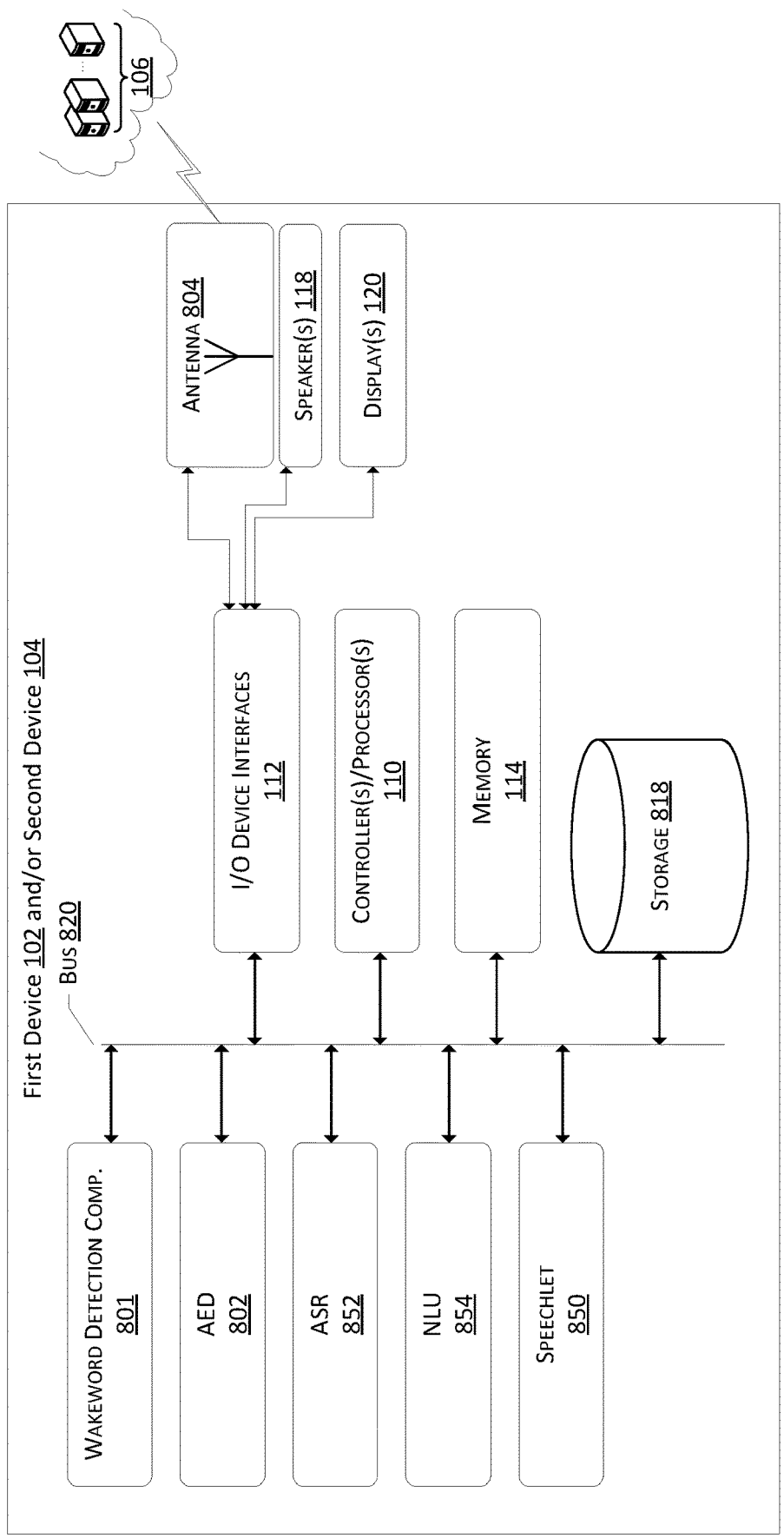
FIG. 8 illustrates a conceptual diagram of example components of an electronic device that may be utilized in association with clock drift estimation.

FIG. 8 illustrates a conceptual diagram of example components of an electronic device 102, 104 that may be utilized in association with for clock drift estimation. The device 102, 104 may be implemented as a standalone device 102, 104 that is relatively simple in terms of functional capabilities with limited input/output components, memory, and processing capabilities. For instance, the device 102, 104 may not have a keyboard, keypad, or other form of mechanical input. The device 102, 104 may also lack a display (other than simple lights, for instance) and a touch screen to facilitate visual presentation and user touch input. Instead, the device 102, 104 may be implemented with the ability to receive and output audio, a network interface (wireless or wire-based), power, and processing/memory capabilities. In certain implementations, a limited set of one or more input components may be employed (e.g., a dedicated button to initiate a configuration, power on/off, etc.) by the device 102, 104. Nonetheless, the primary, and potentially only mode, of user interaction with the device 102, 104 is through voice input and audible output. In some instances, the device 102, 104 may simply comprise a microphone 116, a power source, and functionality for sending generated audio data via one or more antennas 804 to another device.

The device 102, 104 may also be implemented as a more sophisticated computing device, such as a computing device similar to, or the same as, a smart phone or personal digital assistant. The device 102, 104 may include a display 120 with a touch interface and various buttons for providing input as well as additional functionality such as the ability to send and receive communications. Alternative implementations of the device 102, 104 may also include configurations as a personal computer. The personal computer may include a keyboard, a mouse, a display 120, and other hardware or functionality that is found on a desktop, notebook, netbook, or other personal computing devices. In examples, the device 102, 104 may include an automobile, such as a car. In other examples, the device 102, 104 may include a pin on a user's clothes or a phone on a user's person. In examples, the device 102 and may not include speaker(s) 118 and may utilize speaker(s) 118 of an external or peripheral device to output audio via the speaker(s) 118 of the external/peripheral device. In this example, the device 102, 104 might represent a set-top box (STB), and the device 102, 104 may utilize speaker(s) 118 of another device such as a television that is connected to the STB for output of audio via the external speakers. In other examples, the device 102, 104 may not include the microphone(s) 116, and instead, the device 102, 104 can utilize microphone(s) of an external or peripheral device to capture audio and/or generate audio data. In this example, the device 102, 104 may utilize microphone(s) of a headset that is coupled (wired or wirelessly) to the device 102, 104. These types of devices are provided by way of example and are not intended to be limiting, as the techniques described in this disclosure may be used in essentially any device that has an ability to recognize speech input or other types of natural language input.

The device 102, 104 of FIG. 8 may include one or more controllers/processors 110, that may include a central processing unit (CPU) for processing data and computer-readable instructions, and memory 114 for storing data and instructions of the device 102, 104. The device 102, 104 may also be connected to removable or external non-volatile memory and/or storage, such as a removable memory card, memory key drive, networked storage, etc., through input/output device interfaces 112.

Computer instructions for operating the device 102, 104 and its various components may be executed by the device's controller(s)/processor(s) 110, using the memory 114 as temporary "working" storage at runtime. A device's computer instructions may be stored in a non-transitory manner in non-volatile memory 114, storage 818, or an external device(s). Alternatively, some or all of the executable instructions may be embedded in hardware or firmware on the device 102, 104 in addition to or instead of software.

The device 102, 104 may include input/output device interfaces 112. A variety of components may be connected through the input/output device interfaces 112. Additionally, the device 102 may include an address/data bus 820 for conveying data among components of the respective device. Each component within a device 102, 104 may also be directly connected to other components in addition to, or instead of, being connected to other components across the bus 820.

The device 102, 104 may include a display 120, which may comprise a touch interface. Any suitable display technology, such as liquid crystal display (LCD), organic light emitting diode (OLED), electrophoretic, and so on, may be utilized for the displays 120. Furthermore, the processor(s) 110 may comprise graphics processors for driving animation and video output on the associated display, or the device 102, 104 may be "headless" and may primarily rely on spoken commands for input. As a way of indicating to a user that a connection between another device has been opened, the device 102, 104 may be configured with one or more visual indicators, such as the light elements(s), which may be in the form of LED(s) or similar components (not illustrated), that may change color, flash, or otherwise provide visible light output, such as for a notification indicator on the device 102, 104. The input/output device interfaces 112 that connect to a variety of components. This wired or a wireless audio and/or video port may allow for input/output of audio/video to/from the device 102, 104. The device 102, 104 may also include an audio capture component. The audio capture component may be, for example, a microphone 116 or array of microphones, a wired headset or a wireless headset, etc. The microphone 116 may be configured to capture audio. If an array of microphones is included, approximate distance to a sound's point of origin may be determined using acoustic localization based on time and amplitude differences between sounds captured by different microphones of the array. The device 102, 104 (using microphone 116, wakeword detection component 801, ASR component 852, etc.) may be configured to generate audio data corresponding to captured audio. The device 102, 104 (using input/output device interfaces 112, antenna 804, etc.) may also be configured to transmit the audio data to the remote system 106 for further processing or to process the data using internal components such as a wakeword detection component 801.

Via the antenna(s) 804, the input/output device interface 112 may connect to one or more networks 108 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Universal Serial Bus (USB) connections may also be supported. Power may be provided to the device 102, 104 via wired connection to an external alternating current (AC) outlet, and/or via onboard power sources, such as batteries, solar panels, etc.

Through the network(s) 108, the speech-processing system may be distributed across a networked environment. Accordingly, the device 102, 104 and/or the remote system 106 may include an ASR component 852. The ASR component 852 of device 102, 104 may be of limited or extended capabilities. The ASR component 852 may include language models stored in ASR model storage component, and an ASR component 852 that performs automatic speech recognition. If limited speech recognition is included, the ASR component 852 may be configured to identify a limited number of words, such as keywords detected by the device, whereas extended speech recognition may be configured to recognize a much larger range of words.

The device 102, 104 and/or the remote system 106 may include a limited or extended NLU component 854. The NLU component 854 of device 102, 104 may be of limited or extended capabilities. The NLU component 854 may comprise a name entity recognition module, an intent classification module and/or other components. The NLU component 854 may also include a stored knowledge base and/or entity library, or those storages may be separately located.

In examples, AED 802 may also be performed by the device 102, 104. In these examples, the operations may include causing the AED component 802 to be enabled or otherwise turned on, or the operations may include causing the AED component 802 to transition from a first mode to a second mode representing a higher sensitivity to audio data generated by the microphone 116. The AED component 802 may utilize the audio data generated by the microphone 116 to determine if an audio fingerprint of the audio data, or portion thereof, corresponds to a reference audio fingerprint associated with the predefined event. For example, the one or more predefined events may be associated with one or more reference audio fingerprint characteristics of sound made when the event occurs. For example, the sound of a given person speaking may have a given audio fingerprint, the sound of a different person speaking may have another audio fingerprint, etc. The AED component 802 may receive an indication that audio has been captured and may utilize reference audio fingerprints for analysis in association with the audio fingerprint in question. It should be understood that while the term "audio fingerprint" is utilized herein, that term may include other terms such as "audio fingerprint" and/or "audio characteristics" and may correspond to characteristics of the audio data. For example, audio fingerprints may be generated utilizing a spectrogram that may split the audio data up over time and graphs frequency to amplitude over time. Peaks in frequency and/or amplitude may be identified in the spectrogram and may be utilized as characteristic points for comparison to reference audio fingerprints. The AED component 802 may determine that the audio fingerprint corresponds to at least one of the reference audio fingerprints, such as to a given confidence level, and may generate confirmatory data indicating that the audio fingerprint corresponds to the at least one reference audio fingerprint.

The device 102, 104 and/or the remote system 106 may also include speechlet 850 that is configured to execute commands/functions associated with a spoken command as described herein. The device 102, 104 may include a wake word engine, which may be a separate component or may be included in an ASR component 852. The wakeword detection component 801 receives audio signals and detects occurrences of a particular expression (such as a configured keyword) in the audio. This may include detecting a change in frequencies over a specific period of time where the change in frequencies results in a specific audio fingerprint that the system recognizes as corresponding to the keyword. Keyword detection may include analyzing individual directional audio signals, such as those processed post-beamforming if applicable. Other techniques known in the art of keyword detection (also known as keyword spotting) may also be used. In some embodiments, the device 102, 104 may be configured collectively to identify a set of the directional audio signals in which the wake expression is detected or in which the wake expression is likely to have occurred. In examples, the device 102, 104 and may not include speaker(s) 118 and may utilize speaker(s) of an external or peripheral device to output audio via the speaker(s) of the external/peripheral device.

Figure 9A:
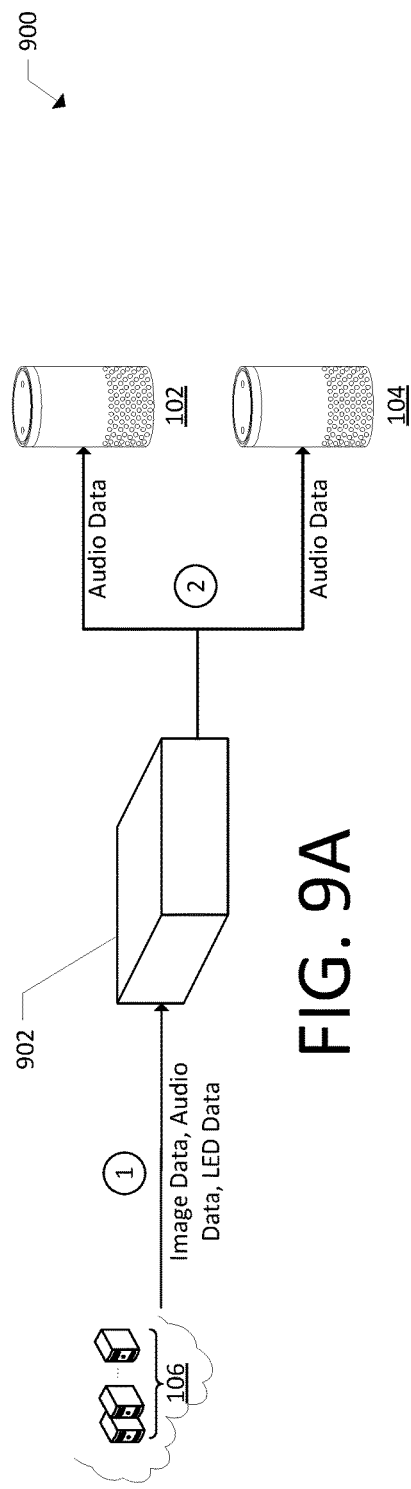
FIG. 9A illustrates a conceptual diagram of example devices utilized for outputting audio in a time-synchronous manner with each other where the audio data is received from a remote system.

FIG. 9A illustrates a conceptual diagram of example devices utilized for outputting audio in a time-synchronous manner with each other and/or with display of images. The system 900 may include at least some of the components of the system 100 from FIG. 1. For example, the system 900 may include an distribution device 902 and/or one or more receiving devices 102, 104 and/or a remote system 106. FIG. 9A depicts the exchange of information and/or the performance of processes via the various components utilizing steps 1 and 2. However, it should be understood that the processes may be performed in any order and need not be performed in sequential order as depicted in FIG. 9A.

At step 1, content data, such as image data, audio data, and/or light emitting diode (LED) data, may be sent from the remote system 106 to the distribution device 102. By way of example, a user may request that content may be displayed and/or otherwise output utilizing devices located in an environment. The request may be from user input to, for example, a personal device such as a mobile phone, tablet, and/or computer, and/or the request may be from a user utterance spoken by the user and captured by a microphone of one or more of the devices within the environment. For example, a user may provide input indicating an intent to play a video associated with a movie on a television within the environment while one or more other devices output audio of the movie. Input data corresponding to the input may be sent to, for example, the remote system 106 configured to retrieve content associated with the request. In examples where the input comprises a user utterance, audio data corresponding to the user utterance may be sent to the remote system 106. A speech-processing system may generate intent data indicating an intent associated with the user utterance. In the example where the user utterance indicates an intent to output content on the one or more devices, a speechlet may receive the intent data and/or a payload associated with the intent data and may utilize that information to determine what content is to be provided to the distribution device 902 for output. A retrieval component may retrieve the requested content and the remote system 106 may send the content to the distribution device 902. The content, in a given example may include image data and audio data. In other examples, the content may include just image data, just audio data, and/or other types of data. In still other examples, the content may be LED data that may be utilized to determine when to cause LEDs and/or other light elements of a device to emit light.

At step 2, the distribution device 902 may send data packets, such as audio-data packets to the receiving devices 102, 104. For example, the distribution device 902 may receive the content data and may send all or a portion of the content data to the receiving devices 102, 104. In these examples, the data may be sent to the receiving devices 102, 104 as data packets utilizing one or more protocols.

The distribution device 902 and/or the receiving devices 102, 104 may utilize associations between time kept by the distribution device 902 and time kept by the receiving devices 102, 104 to determine how and when to send packets to the receiving devices 102, 104 such that the video is output by the distribution device 902 and/or another device having a video interface in a time-synchronous manner with output of the audio on the receiving devices 102, 104.

Figure 9B:
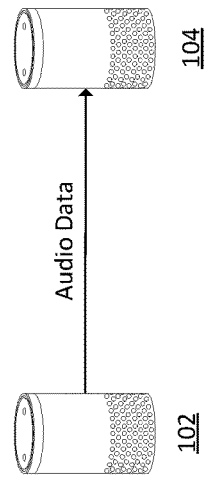
FIG. 9B illustrates a conceptual diagram of example devices utilized for outputting audio where one device sends an instance of audio data to another device for output in a time-synchronous manner.

FIG. 9B illustrates a conceptual diagram of example devices utilized for outputting audio where one device sends an instance of audio data to another device for output in a time-synchronous manner. The system 900 may include at least some of the components of the system 100 from FIG. 1. For example, the system 900 may include one or more devices 102, 104.

A user may request that content may be output utilizing devices located in an environment. The request may be from user input to, for example, a personal device such as a mobile phone, tablet, and/or computer, and/or the request may be from a user utterance spoken by the user and captured by a microphone of one or more of the devices within the environment. For example, a user may provide input indicating an intent to play a song on devices 102, 104 within the environment. Input data corresponding to the input may be sent to, for example, a remote system configured to retrieve content associated with the request. In other examples, the content that is requested may already be downloaded to or otherwise accessible to the device 102. In examples where the input comprises a user utterance, a speech-processing system may generate intent data indicating an intent associated with the user utterance. In the example where the user utterance indicates an intent to output content on the one or more devices 102, 104, a speechlet may receive the intent data and/or a payload associated with the intent data and may utilize that information to determine what content is to be provided.

The device 102 may send data packets, such as audio-data packets to the device 104. For example, the device 102 may receive the content data and may send all or a portion of the content data to the device 104. In these examples, the data may be sent to the device 104 as data packets utilizing one or more protocols. The device 102 and/or the device 104 may utilize associations between time kept by the devices 102, 104 to determine how and when to send packets to the device 104 such that the audio is output by the device 102 in a time-synchronous manner with output of the audio on the device 104.

Figure 9C:
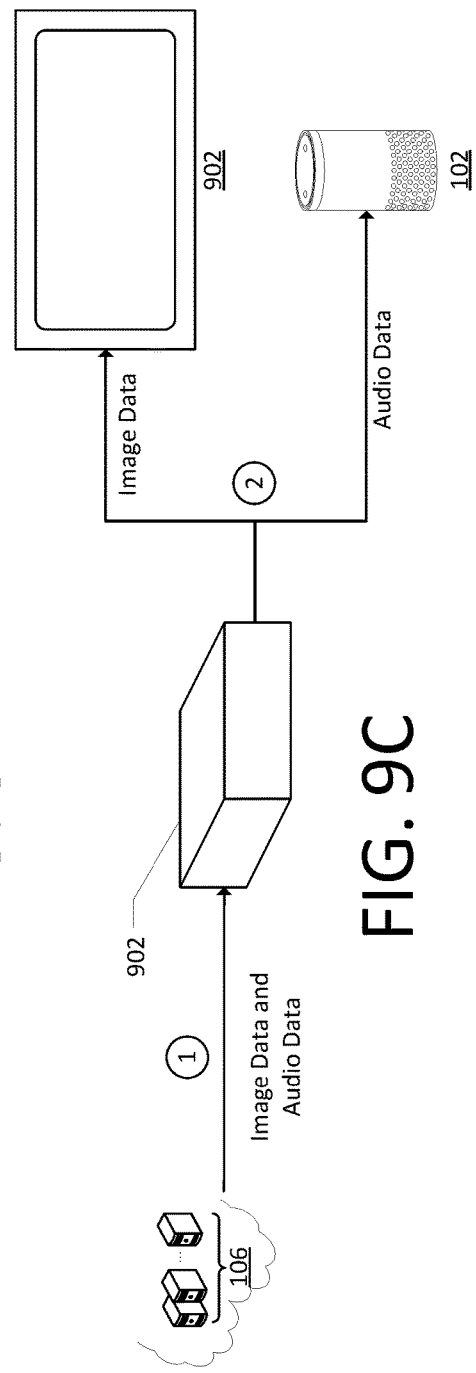
FIG. 9C illustrates a conceptual diagram of examples devices utilized for outputting audio and video in a time-synchronous manner.

FIG. 9C illustrates a conceptual diagram of examples devices utilized for outputting audio and video in a time-synchronous manner. The system 900 may include at least some of the components of the system 100 from FIG. 1. For example, the system 900 may include an distribution device 902 and/or a video interface device 904 and/or an audio-output device 102. FIG. 9 depicts the exchange of information and/or the performance of processes via the various components utilizing steps 1 and 2. However, it should be understood that the processes may be performed in any order and need not be performed in sequential order as depicted in FIG. 9.

At step 1, content data, such as image data and audio data, may be sent from the remote system 106 to the distribution device 902. By way of example, a user may request that content may be displayed and/or otherwise output utilizing devices located in an environment. The request may be from user input to, for example, a personal device such as a mobile phone, tablet, and/or computer, and/or the request may be from a user utterance spoken by the user and captured by a microphone of one or more of the devices within the environment. For example, a user may provide input indicating an intent to play a video associated with a movie on a television within the environment while one or more other devices output audio of the movie. Input data corresponding to the input may be sent to, for example, the remote system 106 configured to retrieve content associated with the request. In examples where the input comprises a user utterance, audio data corresponding to the user utterance may be sent to the remote system 106. A speech-processing system may generate intent data indicating an intent associated with the user utterance. In the example where the user utterance indicates an intent to output content on the one or more devices, a speechlet may receive the intent data and/or a payload associated with the intent data and may utilize that information to determine what content is to be provided to the distribution device 902 for output. A retrieval component may retrieve the requested content and the remote system 106 may send the content to the distribution device 902. The content, in a given example may include image data and audio data. In other examples, the content may include just image data, just audio data, and/or other types of data.

At step 2, the distribution device 902 may send data packets, such as audio-data packets to the audio-output device 102, and image-data packets to the video interface device 904. For example, the distribution device 902 may receive the content data and may send all or a portion of the content data to the video interface device 904 and/or the audio-output device 102. In these examples, the data may be sent to the devices 904, 102 as data packets utilizing one or more protocols.

The distribution device 902 and/or the devices 904, 102 may utilize associations between time kept by the distribution device 902 and time kept by the devices 904, 102 to determine how and when to send packets to the devices 904, 102 such that the video is output by the video interface device 904 and/or another device having a video interface in a time-synchronous manner with output of the audio on the audio-output device 102.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative of some embodiments that fall within the scope of the claims.

What is claimed is:

1. An audio-output device, comprising:
one or more processors; and
non-transitory computer-readable media storing computer-executable instructions that, when executed by the one or more processors, cause the one or more processors to perform operations comprising:
    determining a first value representing a clock crystal frequency difference between a first clock of the audio-output device and a second clock of a second device;
    receiving, from a sensor associated with the audio-output device, first data indicating detection of an environmental condition associated with the audio-output device, the environmental condition indicating an increase in ambient temperature associated with the audio-output device;
    determining, utilizing a predictive filter configured to estimate clock crystal frequency differences between devices and the first data as input to the predictive filter, a second value representing an increase in the clock crystal frequency difference while the environmental condition is associated with the audio-output device;
    determining, utilizing the second value, a resampling rate to apply for outputting audio by the audio-output device;
    receiving, while the environmental condition is associated with the audio-output device, audio data to be utilized for audio output by the audio-output device in time synchronization with output by the second device; and
    outputting audio representing the audio data in time synchronization with output by the second device utilizing the resampling rate.

2. The audio-output device of claim 1, the operations further comprising:
storing second data indicating a first amount of time between when the audio-output device and the second device are scheduled to exchange time-stamp data for determining the clock crystal frequency difference;
determining, in response to receiving the first data, a second amount of time to schedule exchange of the time-stamp data while the environmental condition is associated with the audio-output device, the second amount of time being less than the first amount of time; and
sending the time-stamp data to the second device at intervals corresponding to the second amount of time.

3. The audio-output device of claim 1, wherein the sensor includes a power-usage component configured to indicate amounts of power utilized by the audio-output device, and the operations further comprise:
determining that the first data indicates an amount of power being utilized by the audio-output device to cause a speaker of the audio-output device to output the audio;
determining that the amount of power satisfies a threshold amount of power predetermined to correspond to a temperature increase associated with components of the audio-output device; and
wherein the first data indicates detection of the environmental condition in response to the amount of power satisfying the threshold amount of power.

4. The audio-output device of claim 1, wherein the sensor is configured to detect changes in brightness values associated with a light indicator of the audio-output device, and the operations further comprise:
  determining that the first data indicates a brightness value of the light indicator;
  determining that the brightness value satisfies a threshold brightness value predetermined to correspond to a temperature increase associated with components of the audio-output device; and
  wherein the first data indicates detection of the environmental condition in response to the brightness value satisfying the threshold brightness value.

5. A method, comprising:
  receiving, from a sensor, first data indicating detection of a change in an environmental condition associated with a first device;
  determining, based at least in part on the first data, a value representing a clock crystal frequency difference between a first clock of the first device and a second clock of a second device while the environmental condition is associated with the first device; and
  applying the value to the first device while the change in the environmental condition is associated with the first device.

6. The method of claim 5, further comprising:
  storing second data indicating a first amount of time between when the first device and the second device are scheduled to exchange time-stamp data;
  determining, based at least in part on the first data, a second amount of time to schedule exchange of the time-stamp data; and
  causing the first device to send the time-stamp data to the second device based at least in part on the second amount of time.

7. The method of claim 5, further comprising:
  determining that the first data indicates an amount of power being utilized by the first device to cause a speaker of the first device to output audio; and
  determining that the amount of power contributes to the change in the environmental condition.

8. The method of claim 5, further comprising:
  determining that the first data indicates a brightness value of a light indicator associated with the first device; and
  determining that the brightness value contributes to the change in the environmental condition.

9. The method of claim 5, further comprising:
  determining that the first data indicates a usage value of a wireless network associated with the first device; and
  determining that the usage value contributes to the change in the environmental condition.

10. The method of claim 5, further comprising:
  determining, based at least in part on account data associated with the first device, a location of the first device in an environment, the location indicated as being associated with temperature change at a time of day;
  determining that the first data indicates the time of day; and
  wherein the first data indicates detection of the change in the environmental condition based at least in part on the first data indicating the time of day.

11. The method of claim 5, further comprising:
  determining, utilizing a machine learning model trained to estimate clock crystal frequency differences between devices, that data from the sensor indicates temperature change of the first device, wherein receiving the first data is in response to querying the first device for the first data based at least in part on determining that the data from the sensor indicates the temperature change;
  determining, utilizing the machine learning model and based at least in part on the first data, a degree of the change in the environmental condition; and
  wherein determining the value representing the clock crystal frequency difference comprises determining the value representing the clock crystal frequency difference based at least in part on the degree of the change in the environmental condition.

12. The method of claim 5, wherein the sensor is a component of the second device or a third device, and the method further comprises:
  determining that the first data is received from at least one of the second device or the third device;
  determining that the at least one of the second device or the third device is associated with the environment in which the first device is situated; and
  determining to utilize the first data for determining the value representing the clock crystal frequency difference based at least in part on the at least one of the second device or the third device being associated with the environment.

13. A system, comprising:
  one or more processors; and
  non-transitory computer-readable media storing computer-executable instructions that, when executed by the one or more processors, cause the one or more processors to perform operations comprising:
    receiving, from a sensor associated with a first device, first data indicating detection of a change in an environmental condition associated with the first device;
    determining, based at least in part on the first data, a value representing a clock crystal frequency difference between a first clock of the first device and a second clock of a second device while the environmental condition is associated with the first device; and
    applying the value to the first device while the change in the environmental condition is associated with the first device.

14. The system of claim 13, the operations further comprising:
  storing second data indicating a first amount of time between when the first device and the second device are scheduled to exchange time-stamp data;
  determining, based at least in part on the first data, a second amount of time to schedule exchange of the time-stamp data; and
  causing the first device to send the time-stamp data to the second device based at least in part on the second amount of time.

15. The system of claim 13, the operations further comprising:
  determining that the first data indicates an amount of power being utilized by the first device to cause a speaker of the first device to output audio;
  determining that the amount of power contributes to the change in the environmental condition.

16. The system of claim 13, the operations further comprising:
  determining that the first data indicates a brightness value of a light indicator associated with the first device; and
  determining that the brightness value contributes to the change in the environmental condition.

17. The system of claim 13, the operations further comprising:
- determining that the first data indicates a usage value of a wireless network associated with the first device; and
- determining that the usage value contributes to the change in the environmental condition.

18. The system of claim 13, the operations further comprising:
- determining, based at least in part on account data associated with the first device, a location of the first device in an environment, the location indicated as being associated with temperature change at a time of day;
- determining that the first data indicates the time of day; and
- wherein the first data indicates detection of the change in the environmental condition based at least in part on the first data indicating the time of day.

19. The system of claim 13, the operations further comprising:
- determining, utilizing a machine learning model trained to estimate clock crystal frequency differences between devices, that data from the sensor indicates temperature change of the first device, wherein receiving the first data is in response to querying the first device for the first data based at least in part on determining that the data from the sensor indicates the temperature change;
- determining, utilizing the machine learning model and based at least in part on the first data, a degree of the change in the environmental condition; and
- wherein determining the value representing the clock crystal frequency difference comprises determining the value representing the clock crystal frequency difference based at least in part on the degree of the change in the environmental condition.

20. The system of claim 13, wherein the first device is associated with a device type, and the operations further comprise:
- identifying a third device having the device type; and
- applying the value to the third device while the environmental condition is associated with the first device.

* * * * *